US010890650B2

(12) United States Patent
Droz et al.

(10) Patent No.: US 10,890,650 B2
(45) Date of Patent: Jan. 12, 2021

(54) LIDAR WITH CO-ALIGNED TRANSMIT AND RECEIVE PATHS

(71) Applicant: Waymo LLC, Mountain View, CA (US)

(72) Inventors: Pierre-Yves Droz, Los Altos, CA (US); David Neil Hutchison, Santa Clara, CA (US); Ralph Hamilton Shepard, Menlo Park, CA (US); Nathaniel Golshan, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 207 days.

(21) Appl. No.: 15/695,755

(22) Filed: Sep. 5, 2017

(65) Prior Publication Data

US 2019/0072649 A1  Mar. 7, 2019

(51) Int. Cl.
*G01C 3/08* (2006.01)
*G01S 7/481* (2006.01)
*G01S 7/4914* (2020.01)
*G01S 7/4863* (2020.01)
*G01S 17/89* (2020.01)

(52) U.S. Cl.
CPC .......... *G01S 7/4818* (2013.01); *G01S 7/4812* (2013.01); *G01S 7/4814* (2013.01); *G01S 7/4816* (2013.01); *G01S 7/4817* (2013.01); *G01S 7/4863* (2013.01); *G01S 7/4914* (2013.01); *G01S 17/89* (2013.01)

(58) Field of Classification Search
CPC .... G01S 7/4818; G01S 7/4814; G01S 7/4863; G01S 7/4816; G01S 7/4812; G01S 7/4817

USPC .................................................... 356/4.01
See application file for complete search history.

(56) References Cited

U.S. PATENT DOCUMENTS

| 3,899,145 A | 8/1975 | Stephenson |
| 4,201,442 A | 5/1980 | McMahon et al. |
| 4,544,255 A | 10/1985 | Utagawa |
| 5,159,412 A * | 10/1992 | Willenborg ........ G01B 11/0616 250/559.07 |
| 5,391,869 A | 2/1995 | Ade et al. |
| 5,847,817 A | 12/1998 | Zediker et al. |

(Continued)

FOREIGN PATENT DOCUMENTS

WO  2016116733 A1  7/2016

OTHER PUBLICATIONS

Search Report and Written Opinion for PCT/US2018/045109 dated Dec. 7, 2018.

(Continued)

*Primary Examiner* — Mark Hellner
(74) *Attorney, Agent, or Firm* — McDonnell Boehnen Hulbert & Berghoff LLP

(57) ABSTRACT

One example system includes a light source that emits light. The system also includes a waveguide that guides the emitted light from a first side of the waveguide toward a second side of the waveguide opposite the first side. The waveguide has a third side extending between the first side and the second side. The system also includes a mirror that reflects the guided light toward the third side of the waveguide. At least a portion of the reflected light propagates out of the waveguide toward a scene. The system also includes a light detector, and a lens that focuses light from the scene toward the waveguide and the light detector.

17 Claims, 13 Drawing Sheets

(56) References Cited

U.S. PATENT DOCUMENTS

| | | |
|---|---|---|
| 6,584,052 B1 | 6/2003 | Phillips et al. |
| 7,518,815 B2 | 4/2009 | Rottmayer et al. |
| 7,894,044 B1 | 2/2011 | Sullivan |
| 7,969,558 B2 | 6/2011 | Hall |
| 7,995,875 B2 | 8/2011 | Yasuda et al. |
| 8,081,299 B2 | 12/2011 | Kim et al. |
| 8,190,030 B2 | 5/2012 | Leclair et al. |
| 8,675,181 B2 | 3/2014 | Hall |
| 8,730,456 B2 | 5/2014 | Goldberg et al. |
| 8,743,464 B1 | 6/2014 | Amirparviz |
| 8,767,190 B2 | 7/2014 | Hall |
| 9,405,066 B2 | 8/2016 | Mahgerefteh et al. |
| 9,529,079 B1 | 12/2016 | Droz et al. |
| 9,964,632 B1 | 5/2018 | Droz et al. |
| 10,003,168 B1 | 6/2018 | Villeneuve |
| 10,018,726 B2 | 7/2018 | Hall et al. |
| 10,094,925 B1 | 10/2018 | LaChapelle |
| 10,109,183 B1 | 10/2018 | Franz et al. |
| 10,126,412 B2 | 11/2018 | Eldada et al. |
| 10,132,928 B2 | 11/2018 | Eldada et al. |
| 10,267,970 B2 | 4/2019 | Jones, Jr. et al. |
| 2002/0009262 A1 | 1/2002 | Kasama et al. |
| 2003/0063884 A1 | 4/2003 | Smith et al. |
| 2004/0184502 A1 | 9/2004 | Miyachi et al. |
| 2004/0218869 A1 | 11/2004 | Takahashi |
| 2004/0232430 A1* | 11/2004 | Lempkowski ...... H01L 21/8221 257/80 |
| 2005/0141808 A1 | 6/2005 | Cheben et al. |
| 2009/0147239 A1 | 6/2009 | Zhu et al. |
| 2010/0020306 A1 | 1/2010 | Hall |
| 2010/0302528 A1 | 12/2010 | Hall |
| 2011/0216304 A1 | 9/2011 | Hall |
| 2015/0185313 A1 | 7/2015 | Zhu |
| 2015/0293224 A1 | 10/2015 | Eldada et al. |
| 2016/0047895 A1 | 2/2016 | Dussan |
| 2016/0154165 A1 | 6/2016 | Grot et al. |
| 2016/0161600 A1 | 6/2016 | Eldada et al. |
| 2016/0259038 A1 | 9/2016 | Retterath et al. |
| 2016/0363669 A1* | 12/2016 | Liu ..................... G01S 7/499 |
| 2017/0223249 A1 | 8/2017 | Tillotson et al. |
| 2017/0269215 A1 | 9/2017 | Hall et al. |
| 2017/0370676 A1 | 12/2017 | Volfson et al. |
| 2018/0045886 A1 | 2/2018 | Demaray |
| 2018/0074382 A1 | 3/2018 | Lee et al. |
| 2018/0100924 A1 | 4/2018 | Brinkmeyer |
| 2018/0149815 A1 | 5/2018 | Heroux et al. |
| 2018/0239096 A1 | 8/2018 | Houbertz et al. |
| 2018/0267151 A1 | 9/2018 | Hall et al. |
| 2018/0284227 A1 | 10/2018 | Hall et al. |
| 2018/0284274 A1 | 10/2018 | LaChapelle |
| 2018/0321360 A1 | 11/2018 | Hall et al. |
| 2018/0335628 A1 | 11/2018 | Hung et al. |
| 2019/0011563 A1 | 1/2019 | Hall et al. |
| 2019/0017938 A1 | 1/2019 | Holzapfel et al. |
| 2019/0227147 A1 | 7/2019 | Lin et al. |

OTHER PUBLICATIONS

Jürgen Van Erps, Lawrence Bogaert, Bart Volckaerts, Christof Debaes, Hugo Thienpont, "Prototyping micro-optical components with integrated out-of-plane coupling structures using deep lithography with protons," Proc. SPIE 6185, Micro-Optics, VCSELs, and Photonic Interconnects II: Fabrication, Packaging, and Integration, 618504 (Apr. 21, 2006).

* cited by examiner

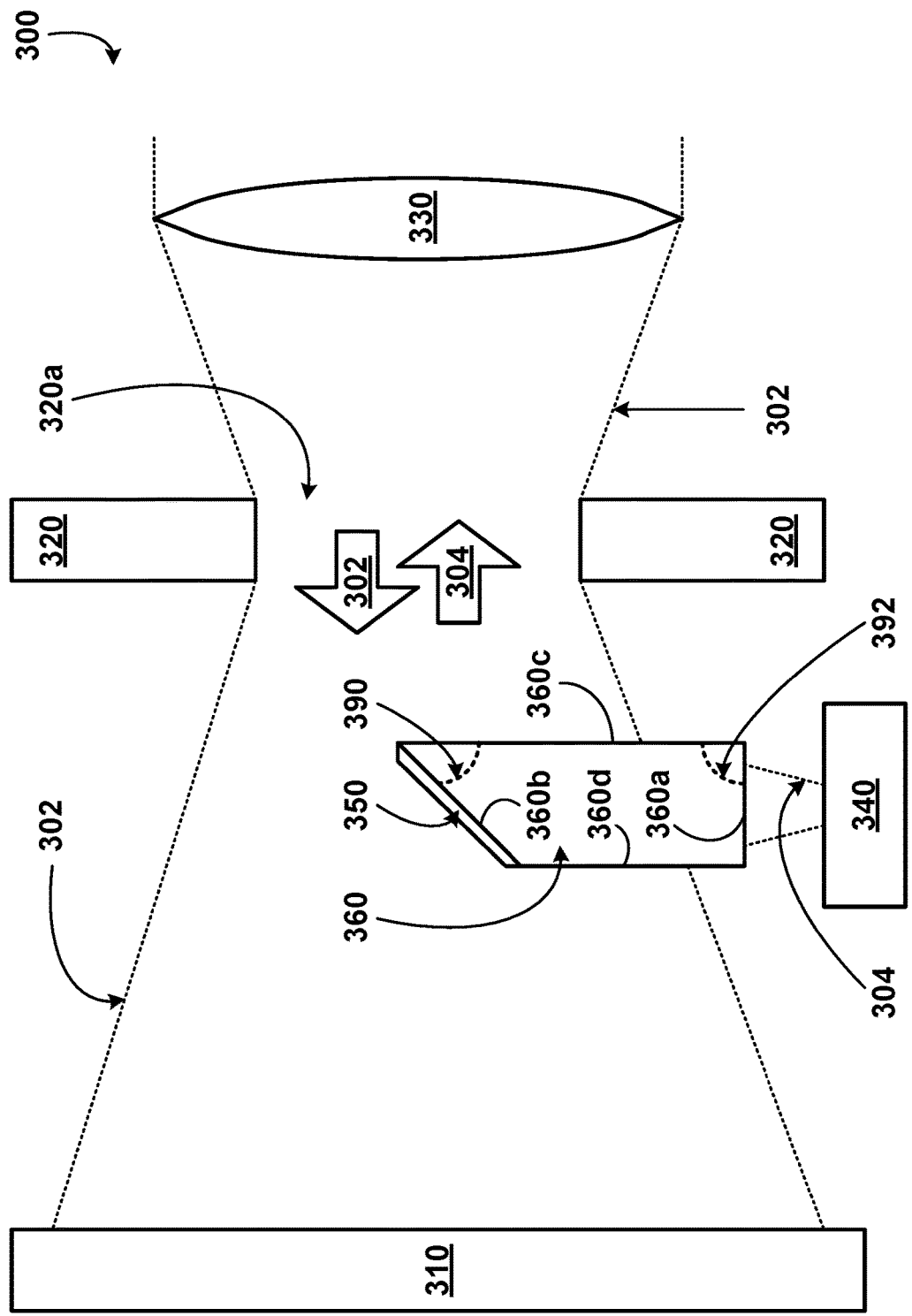

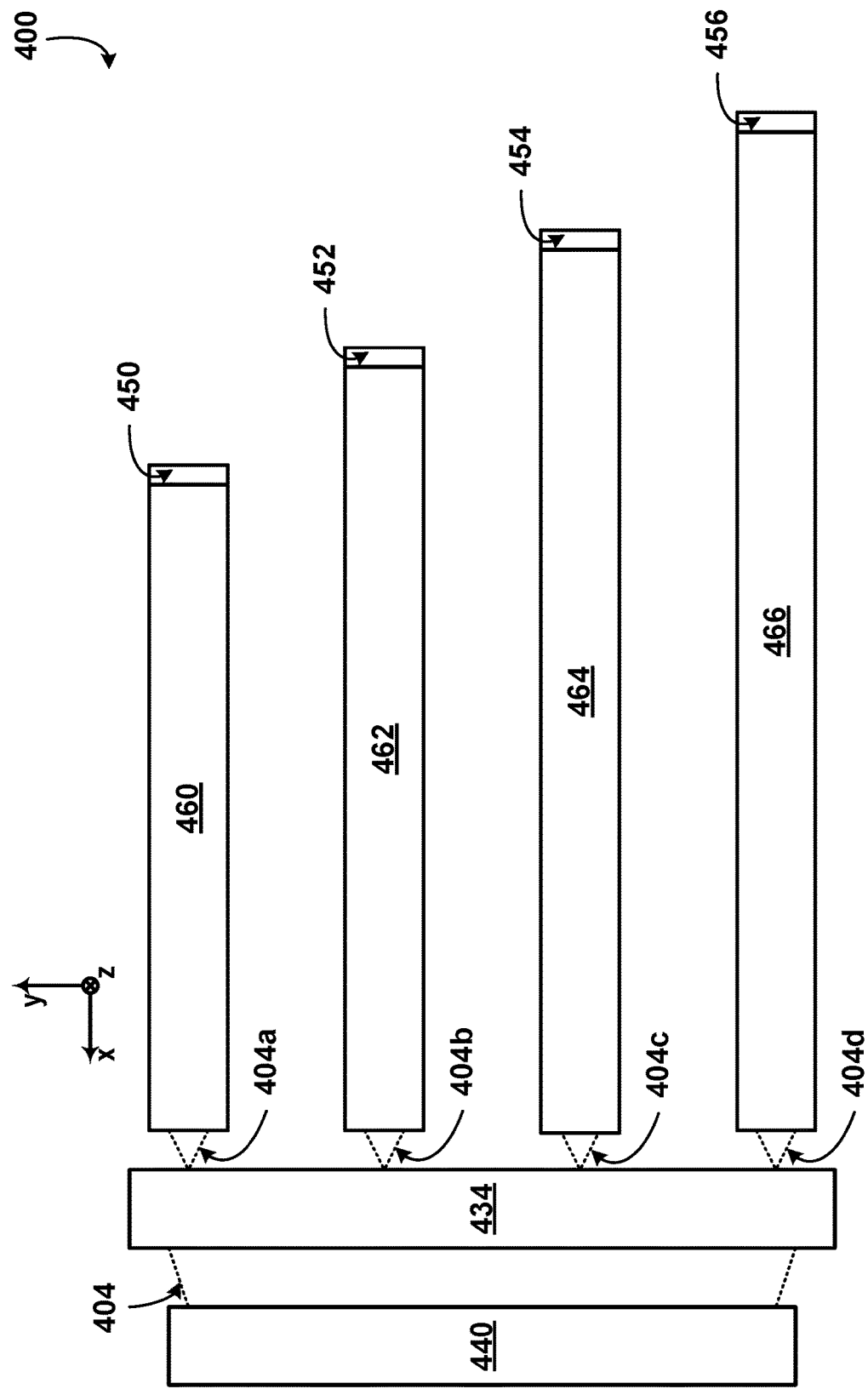

LIDAR WITH CO-ALIGNED TRANSMIT AND RECEIVE PATHS

BACKGROUND

Unless otherwise indicated herein, the materials described in this section are not prior art to the claims in this application and are not admitted to be prior art by inclusion in this section.

Light detectors, such as photodiodes, single photon avalanche diodes (SPADs), or other types of avalanche photodiodes (APDs), can be used to detect light that is imparted on their surfaces (e.g., by outputting an electrical signal, such as a voltage or a current, that indicates an intensity of the light). Many types of such devices are fabricated out of semiconducting materials, such as silicon. In order to detect light over a large geometric area, multiple light detectors can be arranged as an array. These arrays are sometimes referred to as silicon photomultipliers (SiPMs) or multi-pixel photon counters (MPPCs).

Some of the above arrangements are sensitive to relatively low intensities of light, thereby enhancing their detection qualities. However, this can lead to the above arrangements also being disproportionately susceptible to adverse background effects (e.g., extraneous light from outside sources could affect a measurement by the light detectors).

SUMMARY

In one example, a system comprises a light source that emits light. The system also comprises a waveguide that guides the emitted light from a first side of the waveguide to a second side of the waveguide opposite the first side. The waveguide has a third side extending between the first side and the second side. The system also comprises a mirror that reflects the guided light toward the third side of the waveguide. At least a portion of the reflected light propagates out of the waveguide toward a scene. The system also comprises a light detector. The system also comprises a lens that focuses light from the scene toward the waveguide and the light detector.

In another example, a system comprises a light source that emits light. The system also comprises a waveguide having an input end and one or more output ends opposite the input end. The waveguide guides the emitted light from the input end to the one or more output ends. The waveguide has a given side that extends from the input end to the one or more output ends. The system also comprises one or more mirrors that reflect at least a portion of the guided light toward the given side of the waveguide. The reflected light propagates out of the waveguide. The system also comprises a lens that directs, toward a scene, the reflected light propagating out of the waveguide. The system also comprises one or more arrays of light detectors. The lens focuses light from the scene toward the waveguide and the one or more arrays of light detectors.

In yet another example, method involves emitting light toward a first side of a waveguide. The method also involves guiding, inside a waveguide, the emitted light from the first side to a second side of the waveguide opposite the first side. The method also involves reflecting the guided light toward a third side of the waveguide. At least portion of the reflected light propagates out of the third side of the waveguide toward a scene. The method also involves focusing, via a lens, light from the scene onto the waveguide and a light detector.

In still another example, a system comprises means for emitting light toward a first side of a waveguide. The system also comprises means for guiding, inside a waveguide, the emitted light from the first side to a second side of the waveguide opposite the first side. The system also comprises means for reflecting the guided light toward a third side of the waveguide. At least portion of the reflected light propagates out of the third side of the waveguide toward a scene. The system also comprises means for focusing, via a lens, light from the scene onto the waveguide and a light detector.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 3B illustrates a cross-section view of the system of FIG. 3A.

FIG. 4A illustrates a first cross-section view of a system that includes multiple waveguides, according to example embodiments.

DETAILED DESCRIPTION

Figure 1A:
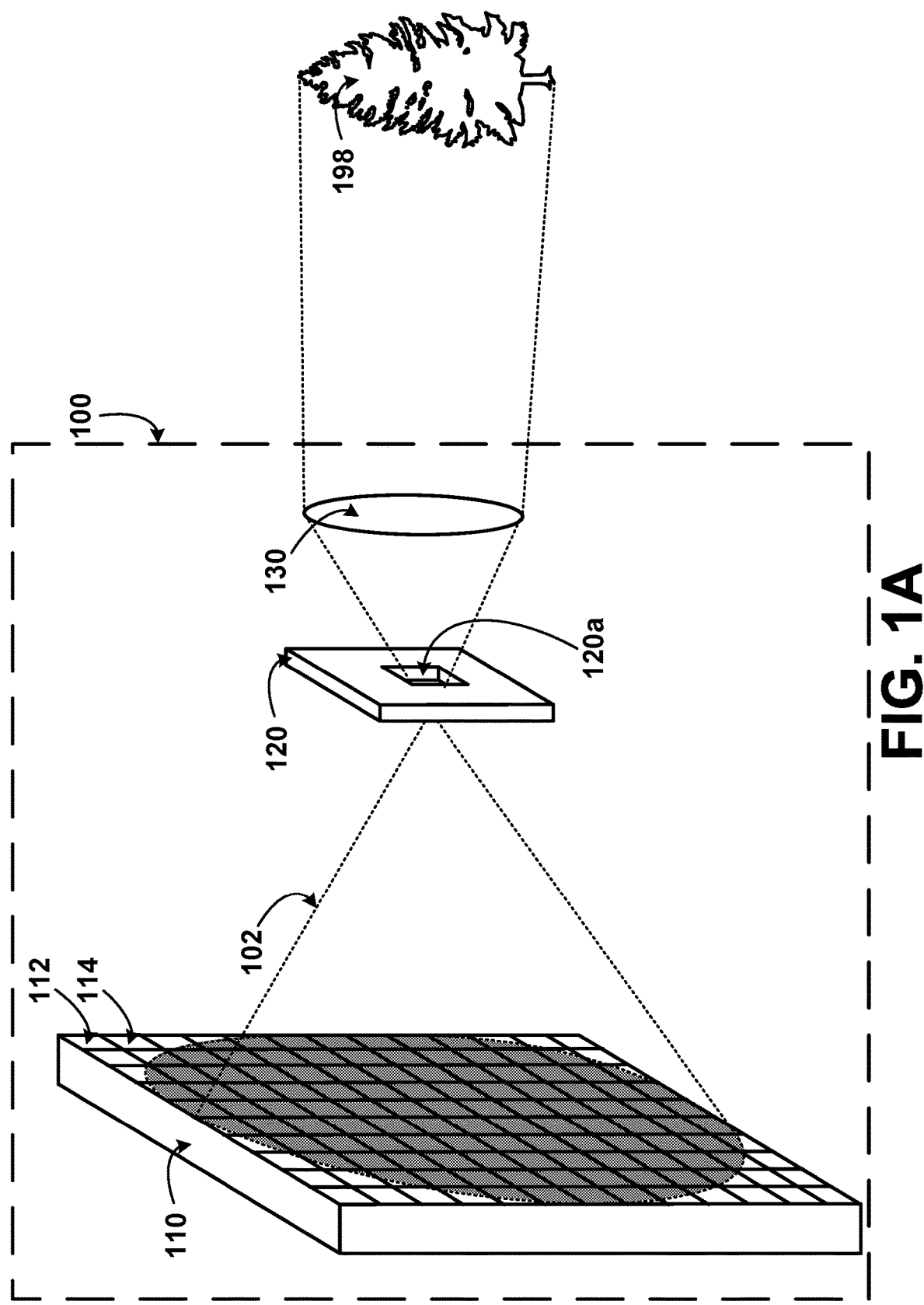
FIG. 1A is an illustration of a system that includes an aperture, according to example embodiments.

Any example embodiment or feature described herein is not necessarily to be construed as preferred or advantageous over other embodiments or features. The example embodiments described herein are not meant to be limiting. It will be readily understood that certain aspects of the disclosed implementations can be arranged and combined in a wide variety of different configurations. Furthermore, the particular arrangements shown in the figures should not be viewed as limiting. It should be understood that other implementations might include more or less of each element shown in a given figure. In addition, some of the illustrated elements may be combined or omitted. Similarly, an example implementation may include elements that are not illustrated in the figures.

I. OVERVIEW

Example implementations may relate to devices, systems, and methods that involve detecting light using one or more light detectors. In some examples, the light detectors may be a sensing component of a light detection and ranging (LI-DAR) device.

One example system includes a lens. The lens may be used to focus light from a scene. However, the lens may also focus background light not intended to be observed by the system (e.g., sunlight). In order to selectively filter the light (i.e., separate background light from light corresponding to information within the scene), an opaque material (e.g., selectively etched metal, a glass substrate partially covered by a mask, etc.) may be placed behind the lens. The opaque material could be shaped as a slab, a sheet, or various other shapes in a variety of embodiments. Within the opaque material, an aperture may be defined. With this arrangement, a portion of, or the entirety of, the light focused by the lens could be selected for transmission through the aperture.

In the direction of propagation of the light transmitted through the aperture, the system may include an array of light detectors (e.g., SPADs, etc.) arranged to detect at least a portion of the focused light transmitted through the aperture.

The system may also include a light source that emits light, and a waveguide that receives the emitted light at an input end of the waveguide. The waveguide guides the emitted light from the input end to an output end of the waveguide opposite the input end. The waveguide has a given side that extends from the input end to the output end. The waveguide transmits at least a portion of the emitted light out of the given side and toward the lens. In general, the output end of the waveguide may be positioned along a propagation path of the focused light propagating from the lens to the array of light detectors. In one embodiment, the emitted light transmitted out of the waveguide may propagate through the same aperture through which the focused light is transmitted toward the array of light detectors.

To facilitate propagation of the guided light out of the given side of the waveguide, in some examples, the system may include a mirror disposed along a propagation path of the guided light propagating inside the waveguide. The mirror may be tilted toward the given side of the waveguide. As such, the mirror may reflect the guided light (or a portion thereof) toward a particular region of the given side that is co-aligned with the path of the focused light propagating toward the array of light detectors. For example, the particular region may be adjacent to the aperture defined by the opaque material.

Thus, in one example arrangement, the system may illuminate the scene by directing the emitted light according to a transmit path that extends through the waveguide, aperture, and lens. The system may also receive reflections of the emitted light from the illuminated scene according to a receive path that extends through the same lens and aperture. The transmit and receive paths of the light in this example could thus be co-aligned (e.g., associated with same or similar respective fields-of-view).

Because the transmit path is spatially aligned with the receive path, the example system may reduce (or prevent) optical scanning distortions associated with parallax. For instance, if the transmit and receive paths were instead to be spatially offset relative to one another (e.g., have different respective viewing or pointing directions, etc.), a scanned representation of the scene could be affected by optical distortions such as parallax.

Other aspects, features, implementations, configurations, arrangements, and advantages are possible as well.

II. EXAMPLE SYSTEMS AND DEVICES

FIG. 1A is an illustration of a system 100 that includes an aperture, according to example embodiments. As shown, system 100 includes an array 110 of light detectors (exemplified by detectors 112 and 114), an aperture 120a defined within an opaque material 120, and a lens 130. System 100 may measure light 102 reflected or scattered by an object 198 within a scene. In some instances, light 102 may also include light propagating directly from background sources (not shown) toward lens 130. In some examples, system 100 may be included in a light detection and ranging (LIDAR) device. For example, the LIDAR device may be used for navigation of an autonomous vehicle. Further, in some embodiments, system 100, or portions thereof, may be contained within an area that is unexposed to exterior light other than through lens 130. This may reduce an amount of ambient light (which may affect measurements) reaching the detectors in array 110.

Array 110 includes an arrangement of light detectors, exemplified by detectors 112 and 114. In various embodiments, array 110 may have different shapes. As shown, array 110 has a rectangular shape. However, in other embodiments, array 110 may be circular or may have a different shape. The size of array 110 may be selected according to an expected cross-sectional area of light 110 diverging from aperture 120a. For example, the size of array 110 may be based on the distance between array 110 and aperture 120a, the distance between aperture 120a and lens 130, dimensions of aperture 120a, optical characteristics of lens 130, among other factors. In some embodiments, array 110 may be movable. For example, the location of array 110 may be adjustable so as to be closer to, or further from, aperture 120a. To that end, for instance, array 110 could be mounted on an electrical stage capable of translating in one, two, or three dimensions.

Further, in some implementations, array 110 may provide one or more outputs to a computing device or logic circuitry. For example, a microprocessor-equipped computing device may receive electrical signals from array 110 which indicate an intensity of light 102 incident on array 110. The computing device may then use the electrical signals to determine information about object 198 (e.g., distance between object 198 and system 100, etc.). In some embodiments, some or all of the light detectors within array 110 may be interconnected with one another in parallel. To that end, for example, array 110 may be a SiPM or an MPPC, depending on the particular arrangement and type of the light detectors within array 110. By connecting the light detectors in a parallel circuit configuration, for instance, the outputs from the light detectors can be combined to effectively increase a detection area in which a photon in light 102 can be detected (e.g., shaded region of array 110 shown in FIG. 1A).

Light detectors 112, 114, etc., may include various types of light detectors. In one example, detectors 112, 114, etc., include SPADs. SPADs may employ avalanche breakdown within a reverse biased p-n junction (i.e., diode) to increase an output current for a given incident illumination on the SPAD. Further, SPADs may be able to generate multiple electron-hole pairs for a single incident photon. In another example, light detectors 112, 114, etc., may include linear-mode avalanche photodiodes (APDs). In some instances, APDs or SPADs may be biased above an avalanche breakdown voltage. Such a biasing condition may create a positive feedback loop having a loop gain that is greater than one. Further, SPADs biased above the threshold avalanche breakdown voltage may be single photon sensitive. In other examples, light detectors 112, 114, etc., may include photoresistors, charge-coupled devices (CCDs), photovoltaic cells, and/or any other type of light detector.

In some implementations, array 110 may include more than one type of light detector across the array. For example, array 110 can be configured to detect multiple predefined wavelengths of light 102. To that end, for instance, array 110 may comprise some SPADs that are sensitive to one range of wavelengths and other SPADs that are sensitive to a different range of wavelengths. In some embodiments, light detectors 110 may be sensitive to wavelengths between 400 nm and 1.6 µm (visible and/or infrared wavelengths). Further, light detectors 110 may have various sizes and shapes within a given embodiment or across various embodiments. In some embodiments, light detectors 112, 114, etc., may include SPADs that have package sizes that are 1%, 0.1%, or 0.01% of the area of array 110.

Opaque material 120 (e.g., mask, etc.) may block a portion of light 102 from the scene (e.g., background light) that is focused by the lens 130 from being transmitted to array 110. For example, opaque material 120 may be configured to block certain background light that could adversely affect the accuracy of a measurement performed by array 110. Alternatively or additionally, opaque material 120 may block light in the wavelength range detectable by detectors 112, 114, etc. In one example, opaque material 120 may block transmission by absorbing a portion of incident light. In another example, opaque material 120 may block transmission by reflecting a portion of incident light. A non-exhaustive list of example implementations of opaque material 120 includes an etched metal, a polymer substrate, a biaxially-oriented polyethylene terephthalate (BoPET) sheet, or a glass overlaid with an opaque mask, among other possibilities. In some examples, opaque material 120, and therefore aperture 120a, may be positioned at or near a focal plane of lens 130.

Aperture 120a provides a port within opaque material 120 through which light 102 (or a portion thereof) may be transmitted. Aperture 120a may be defined within opaque material 120 in a variety of ways. In one example, opaque material 120 (e.g., metal, etc.) may be etched to define aperture 120a. In another example, opaque material 120 may be configured as a glass substrate overlaid with a mask, and the mask may include a gap that defines aperture 120a (e.g., via photolithography, etc.). In various embodiments, aperture 120a may be partially or wholly transparent, at least to wavelengths of light that are detectable by light detectors 112, 114, etc. For example, where opaque material 120 is a glass substrate overlaid with a mask, aperture 120a may be defined as a portion of the glass substrate not covered by the mask, such that aperture 120a is not completely hollow but rather made of glass. Thus, in some instances, aperture 120a may be nearly, but not entirely, transparent to one or more wavelengths of light 102 (e.g., glass substrates are typically not 100% transparent). Alternatively, in some instances, aperture 120a may be formed as a hollow region of opaque material 120.

In some examples, aperture 120a (in conjunction with opaque material 120) may be configured to spatially filter light 102 from the scene at the focal plane. To that end, for example, light 102 may be focused onto a focal plane along a surface of opaque material 120, and aperture 120a may allow only a portion of the focused light to be transmitted to array 110. As such, aperture 120a may behave as an optical pinhole. In one embodiment, aperture 120a may have a cross-sectional area of between 0.02 mm$^2$ and 0.06 mm$^2$ (e.g., 0.04 mm$^2$). In other embodiments, aperture 120a may have a different cross-sectional area depending on various factors such as optical characteristics of lens 130, distance to array 110, noise rejection characteristics of the light detectors in array 110, etc.

Thus, although the term "aperture" as used above with respect to aperture 120a may describe a recess or hole in an opaque material through which light may be transmitted, it is noted that the term "aperture" may include a broad array of optical features. In one example, as used throughout the description and claims, the term "aperture" may additionally encompass transparent or translucent structures defined within an opaque material through which light can be at least partially transmitted. In another example, the term "aperture" may describe a structure that otherwise selectively limits the passage of light (e.g., through reflection or refraction), such as a mirror surrounded by an opaque material. In one example embodiment, mirror arrays surrounded by an opaque material may be arranged to reflect light in a certain direction, thereby defining a reflective portion, which may be referred to as an "aperture".

Although aperture 120a is shown to have a rectangular shape, it is noted that aperture 120a can have a different shape, such as a round shape, circular shape, elliptical shape, among others. In some examples, aperture 120a can alternatively have an irregular shape specifically designed to account for optical aberrations within system 100. For example, a keyhole shaped aperture may assist in accounting for parallax occurring between an emitter (e.g., light source that emits light 102) and a receiver (e.g., lens 130 and array 110). The parallax may occur if the emitter and the receiver are not located at the same position, for example. Other irregular aperture shapes are also possible, such as specifically shaped apertures that correspond with particular objects expected to be within a particular scene or irregular apertures that select specific polarizations of light 102 (e.g., horizontal or vertical polarizations).

Lens 130 may focus light 102 from the scene onto the focal plane where aperture 120a is positioned. With this arrangement, the light intensity collected from the scene, at lens 130, may be focused to have a reduced cross-sectional area over which light 102 is projected (i.e., increasing the spatial power density of light 102). For example, lens 130 may include a converging lens, a biconvex lens, and/or a spherical lens, among other examples. Alternatively, lens 130 can be implemented as a consecutive set of lenses positioned one after another (e.g., a biconvex lens that focuses light in a first direction and an additional biconvex lens that focuses light in a second direction). Other types of lenses and/or lens arrangements are also possible. In addition, system 100 may include other optical elements (e.g., mirrors, etc.) positioned near lens 130 to aid in focusing light 102 incident on lens 130 onto opaque material 120.

Object 198 may be any object positioned within a scene surrounding system 100. In implementations where system 100 is included in a LIDAR device, object 198 may be illuminated by a LIDAR transmitter that emits light (a portion of which may return as light 102). In example embodiments where the LIDAR device is used for navigation on an autonomous vehicle, object 198 may be or include pedestrians, other vehicles, obstacles (e.g., trees, debris, etc.), or road signs, among others.

As noted above, light 102 may be reflected or scattered by object 198, focused by lens 130, transmitted through aperture 120a in opaque material 120, and measured by light detectors in array 110. This sequence may occur (e.g., in a LIDAR device) to determine information about object 198. In some embodiments, light 102 measured by array 110 may additionally or alternatively include light reflected or scattered off multiple objects, transmitted by a transmitter of another LIDAR device, ambient light, sunlight, among other possibilities.

In some examples, the wavelength(s) of light 102 used to analyze object 198 may be selected based on the types of objects expected to be within a scene and their expected distance from lens 130. For example, if an object expected to be within the scene absorbs all incoming light of 500 nm wavelength, a wavelength other than 500 nm may be selected to illuminate object 198 and to be analyzed by system 100. The wavelength of light 102 (e.g., if transmitted by a transmitter of a LIDAR device) may be associated with a source that generates light 102 (or a portion thereof). For example, if the light is generated by a laser diode, light 102 may comprise light within a wavelength range that includes 900 nm (or other infrared and/or visible wavelength). Thus, various types of light sources are possible for generating light 102 (e.g., an optical fiber amplifier, various types of lasers, a broadband source with a filter, etc.).

As shown, light 102 diverges as it propagates away from aperture 120a. Due to the divergence, a detection area at array 110 (e.g., shown as shaded area illuminated by light 102) may be larger than a cross-sectional area of aperture 120a. An increased detection area (e.g., measured in $m^2$) for a given light power (e.g., measured in W) may lead to a reduced light intensity $$\left(\text{e.g., measured in } \frac{W}{m^2}\right)$$

incident on array 110.

The reduction in light intensity may be particularly beneficial in embodiments where array 110 includes SPADs or other light detectors having high sensitivities. For example, SPADs derive their sensitivity from a large reverse-bias voltage that produces avalanche breakdown within a semiconductor. This avalanche breakdown can be triggered by the absorption of a single photon, for example. Once a SPAD absorbs a single photon and the avalanche breakdown begins, the SPAD cannot detect additional photons until the SPAD is quenched (e.g., by restoring the reverse-bias voltage). The time until the SPAD is quenched may be referred to as the recovery time. If additional photons are arriving at time intervals approaching the recovery time (e.g., within a factor of ten), the SPAD may begin to saturate, and the measurements by the SPAD may thus become less reliable. By reducing the light power incident on any individual light detector (e.g., SPAD) within array 110, the light detectors (e.g., SPADs) in array 110 may remain unsaturated. As a result, the light measurements by each individual SPAD may have an increased accuracy.

Figure 1B:
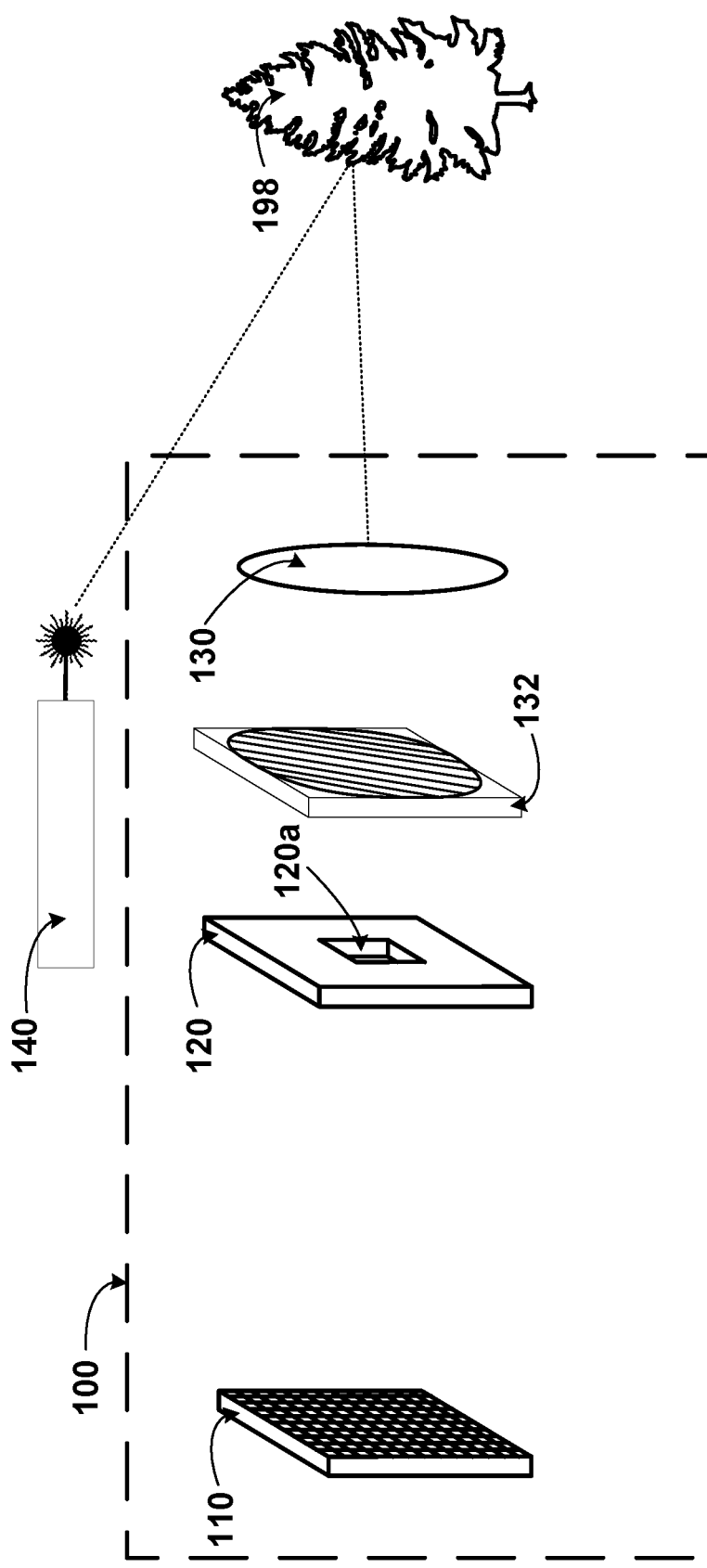
FIG. 1B is another illustration of the system of FIG. 1A.

FIG. 1B is another illustration of system 100. As shown, system 100 also includes a light filter 132 and a light emitter 140. Filter 132 may include any optical filter configured to selectively transmit light within a predefined wavelength range. For example, filter 132 can be configured to selectively transmit light within a visible wavelength range, an infrared wavelength range, or any other wavelength range of the light signal emitted by emitter 140. For example, optical filter 132 may be configured to attenuate light of particular wavelengths or divert light of particular wavelengths away from the array 110. For instance, optical filter 132 may attenuate or divert wavelengths of light 102 that are outside of the wavelength range emitted by emitter 140. Therefore, optical filter 132 may, at least partially, reduce ambient light or background light from adversely affecting measurements by array 110.

In various embodiments, optical filter 132 may be located in various positions relative to array 110. As shown, optical filter 132 is located between lens 130 and opaque material 120. However, optical filter 132 may alternatively be located between lens 130 and object 198, between opaque material 120 and array 110, combined with array 110 (e.g., array 110 may have a surface screen that optical filter 132, or each of the light detectors in array 110 may individually be covered by a separate optical filter, etc.), combined with aperture 120a (e.g., aperture 120a may be transparent only to a particular wavelength range, etc.), or combined with lens 130 (e.g., surface screen disposed on lens 130, material of lens 130 transparent only to a particular wavelength range, etc.), among other possibilities.

As shown in FIG. 1B, light emitter 140 emits a light signal to be measured by array 110. Emitter 140 may include a laser diode, fiber laser, a light-emitting diode, a laser bar, a nanostack diode bar, a filament, a LIDAR transmitter, or any other light source. As shown, emitter 140 may emit light which is reflected by object 198 in the scene and ultimately measured (at least a portion thereof) by array 110. In some embodiments, emitter 140 may be implemented as a pulsed laser (as opposed to a continuous wave laser), allowing for increased peak power while maintaining an equivalent continuous power output.

Figure 2A:
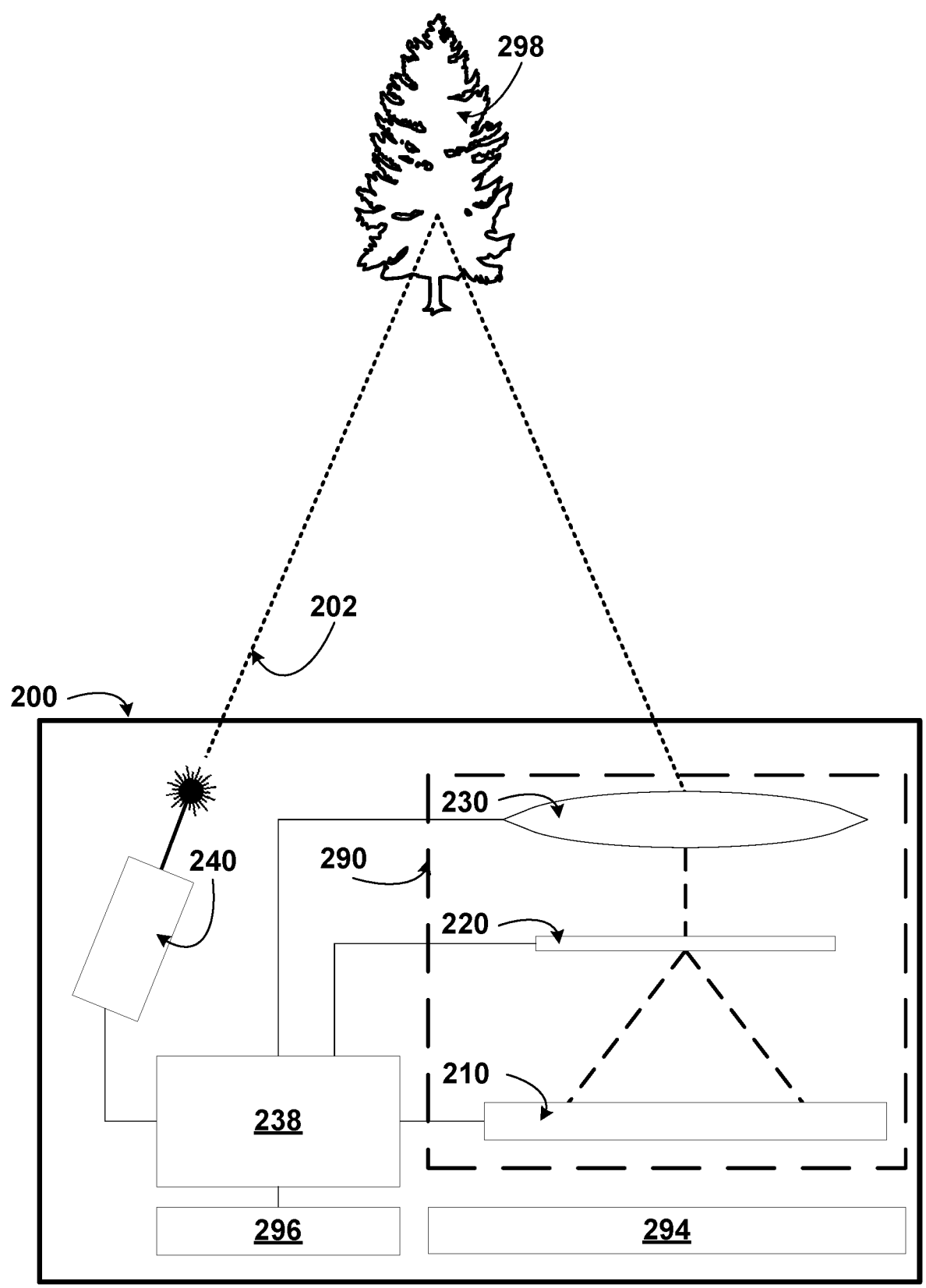
FIG. 2A is a simplified block diagram of a LIDAR device, according to example embodiments.

FIG. 2A is a simplified block diagram of a LIDAR device 200, according to example embodiments. In some example embodiments, LIDAR device 200 can be mounted to a vehicle and employed to map a surrounding environment (e.g., the scene including object 298, etc.) of the vehicle. As shown, LIDAR device 200 includes a controller, 238, a laser emitter 240 that may be similar to emitter 140, and a noise limiting system 290 that may be similar to system 100, a rotating platform 294, and one or more actuators 296. System 290 includes an array 210 of light detectors, an opaque material 220 with an aperture defined therein (not shown), and a lens 230, which can be similar, respectively, to array 110, opaque material 120, and lens 130. It is noted that LIDAR device 200 may alternatively include more or fewer components than those shown. For example, LIDAR device 200 may include an optical filter (e.g., filter 132). Thus, system 290 can be implemented similarly to system 100 and/or any other noise limiting system described herein.

Device 200 may operate emitter 240 to emit light 202 toward a scene that includes object 298, similarly to, respectively, emitter 140, light 102, and object 198 of device 100. To that end, in some implementations, emitter 240 (and/or one or more other components of device 200) can be configured as a LIDAR transmitter of LIDAR device 200. Device 200 may then detect reflections of light 202 from the scene to map or otherwise determine information about object 298. To that end, in some implementations, array 210 (and/or one or more other components of system 290) can be configured as a LIDAR receiver of LIDAR device 200.

Controller 238 may be configured to control one or more components of LIDAR device 200 and to analyze signals received from the one or more components. To that end, controller 238 may include one or more processors (e.g., a microprocessor, etc.) that execute instructions stored in a memory (not shown) of device 200 to operate device 200. Additionally or alternatively, controller 238 may include digital or analog circuitry wired to perform one or more of the various functions described herein.

Rotating platform 294 may be configured to rotate about an axis to adjust a pointing direction of LIDAR 200 (e.g., direction of emitted light 202 relative to the environment, etc.). To that end, rotating platform 294 can be formed from any solid material suitable for supporting one or more components of LIDAR 200. For example, system 290 (and/or emitter 240) may be supported (directly or indirectly) by rotating platform 294 such that each of these components moves relative to the environment while remaining in a particular relative arrangement in response to rotation of rotating platform 294. In particular, the mounted components could be rotated (simultaneously) about an axis so that LIDAR 200 may adjust its pointing direction while scanning the surrounding environment. In this manner, a pointing direction of LIDAR 200 can be adjusted horizontally by actuating rotating platform 294 to different directions about the axis of rotation. In one example, LIDAR 200 can be mounted on a vehicle, and rotating platform 294 can be rotated to scan regions of the surrounding environment at various directions from the vehicle.

In order to rotate platform 294 in this manner, one or more actuators 296 may actuate rotating platform 294. To that end, actuators 296 may include motors, pneumatic actuators, hydraulic pistons, and/or piezoelectric actuators, among other possibilities.

With this arrangement, controller 238 could operate actuator(s) 296 to rotate rotating platform 294 in various ways so as to obtain information about the environment. In one example, rotating platform 294 could be rotated in either direction about an axis. In another example, rotating platform 294 may carry out complete revolutions about the axis such that LIDAR 200 scans a 360° field-of-view (FOV) of the environment. In yet another example, rotating platform 294 can be rotated within a particular range (e.g., by repeatedly rotating from a first angular position about the axis to a second angular position and back to the first angular position, etc.) to scan a narrower FOV of the environment. Other examples are possible.

Moreover, rotating platform 294 could be rotated at various frequencies so as to cause LIDAR 200 to scan the environment at various refresh rates. In one embodiment, LIDAR 200 may be configured to have a refresh rate of 10 Hz. For example, where LIDAR 200 is configured to scan a 360° FOV, actuator(s) 296 may rotate platform 294 for ten complete rotations per second.

Figure 2B:
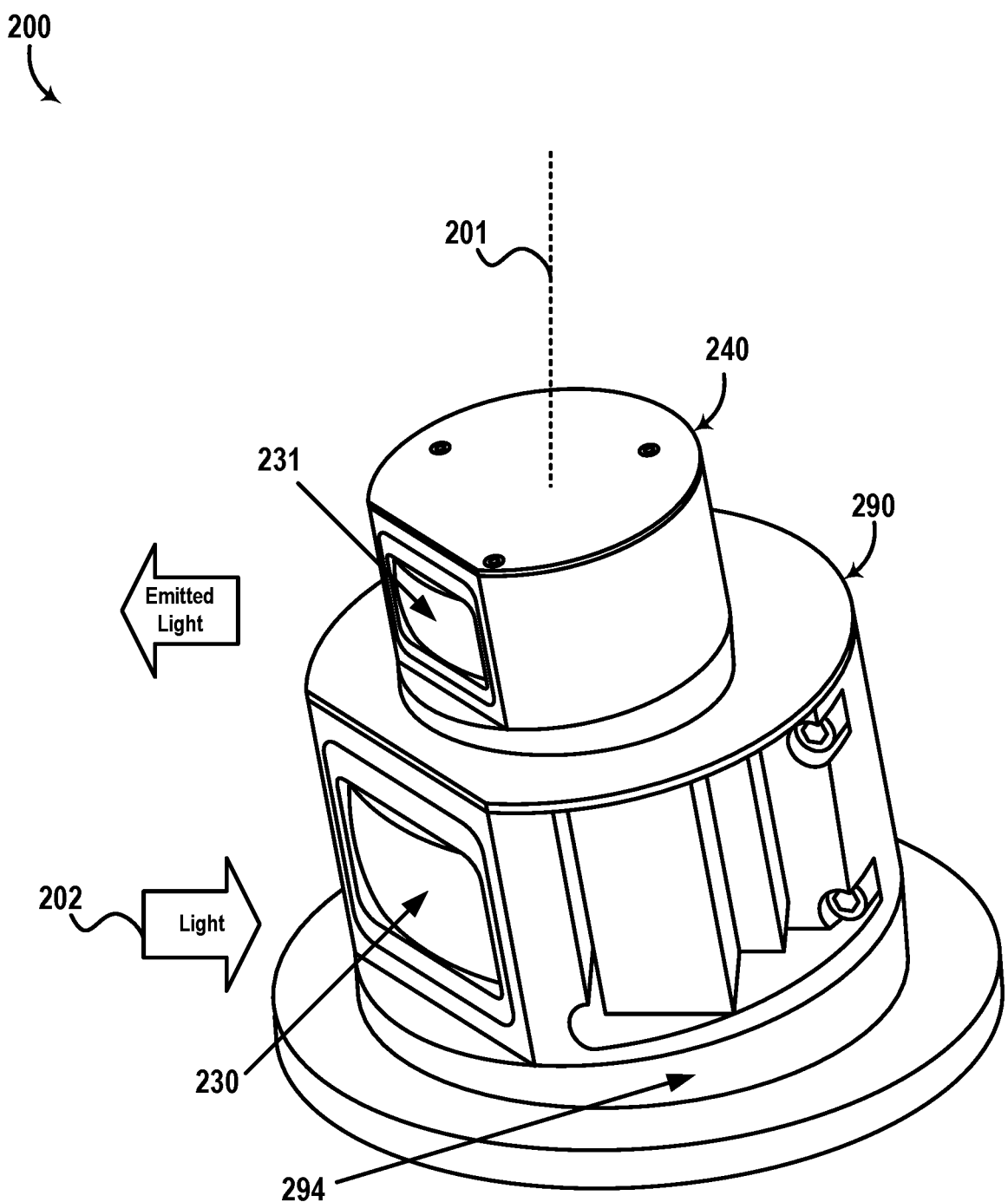
FIG. 2B illustrates a perspective view of the LIDAR device of FIG. 2A.

FIG. 2B illustrates a perspective view of LIDAR device 200. As shown, device 200 also includes a transmitter lens 231 that directs emitted light from emitter 240 toward the environment of device 200.

To that end, FIG. 2B illustrates an example implementation of device 200 where emitter 240 and system 290 each have separate respective optical lenses 231 and 230. However, in other embodiments, device 200 can be alternatively configured to have a single shared lens for both emitter 240 and system 290. By using a shared lens to both direct the emitted light and receive the incident light (e.g., light 202), advantages with respect to size, cost, and/or complexity can be provided. For example, with a shared lens arrangement, device 200 can mitigate parallax associated with transmitting light (by emitter 240) from a different viewpoint than a viewpoint from which light 202 is received (by system 290).

As shown in FIG. 2B, light beams emitted by emitter 240 propagate from lens 231 along a pointing direction of LIDAR 200 toward an environment of LIDAR 200, and may then reflect off one or more objects in the environment as light 202. LIDAR 200 may then receive reflected light 202 (e.g., through lens 230) and provide data pertaining to the one or more objects (e.g., distance between the one or more objects and the LIDAR 200, etc.).

Further, as shown in FIG. 2B, rotating platform 294 mounts system 290 and emitter 240 in the particular relative arrangement shown. By way of example, if rotating platform 294 rotates about axis 201, the pointing directions of system 290 and emitter 240 may simultaneously change according to the particular relative arrangement shown. Through this process, LIDAR 200 can scan different regions of the surrounding environment according to different pointing directions of LIDAR 200 about axis 201. Thus, for instance, device 200 (and/or another computing system) can determine a three-dimensional map of a 360° (or less) view of the environment of device 200 by processing data associated with different pointing directions of LIDAR 200 about axis 201.

In some examples, axis 201 may be substantially vertical. In these examples, the pointing direction of device 200 can be adjusted horizontally by rotating system 290 (and emitter 240) about axis 201.

In some examples, system 290 (and emitter 240) can be tilted (relative to axis 201) to adjust the vertical extents of the FOV of LIDAR 200. By way of example, LIDAR device 200 can be mounted on top of a vehicle. In this example, system 290 (and emitter 240) can be tilted (e.g., toward the vehicle) to collect more data points from regions of the environment that are closer to a driving surface on which the vehicle is located than data points from regions of the environment that are above the vehicle. Other mounting positions, tilting configurations, and/or applications of LIDAR device 200 are possible as well (e.g., on a different side of the vehicle, on a robotic device, or on any other mounting surface).

It is noted that the shapes, positions, and sizes of the various components of device 200 can vary, and are illustrated as shown in FIG. 2B only for the sake of example.

Returning now to FIG. 2A, in some implementations, controller 238 may use timing information associated with a signal measured by array 210 to determine a location (e.g., distance from LIDAR device 200) of object 298. For example, in embodiments where emitter 240 is a pulsed laser, controller 238 can monitor timings of output light pulses and compare those timings with timings of signal pulses measured by array 210. For instance, controller 238 can estimate a distance between device 200 and object 298 based on the speed of light and the time of travel of the light pulse (which can be calculated by comparing the timings). In one implementation, during the rotation of platform 294, emitter 240 may emit light pulses (e.g., light 202), and system 290 may detect reflections of the emitted light pulses. Device 200 (or another computer system that processes data from device 200) can then generate a three-dimensional (3D) representation of the scanned environment based on a comparison of one or more characteristics (e.g., timing, pulse length, light intensity, etc.) of the emitted light pulses and the detected reflections thereof.

In some implementations, controller 238 may be configured to account for parallax (e.g., due to laser emitter 240 and lens 230 not being located at the same location in space). By accounting for the parallax, controller 238 can improve accuracy of the comparison between the timing of the output light pulses and the timing of the signal pulses measured by the array 210.

In some implementations, controller 238 could modulate light 202 emitted by emitter 240. For example, controller 238 could change the projection (e.g., pointing) direction of emitter 240 (e.g., by actuating a mechanical stage, such as platform 294 for instance, that mounts emitter 240). As another example, controller 238 could modulate the timing, the power, or the wavelength of light 202 emitted by emitter 240. In some implementations, controller 238 may also control other operational aspects of device 200, such as adding or removing filters (e.g., filter 132) along a path of propagation of light 202, adjusting relative positions of various components of device 200 (e.g., array 210, opaque material 220 (and an aperture therein), lens 230, etc.), among other possibilities.

In some implementations, controller 238 could also adjust an aperture (not shown) within material 220. In some embodiments, the aperture may be selectable from a number of apertures defined within the opaque material. In such embodiments, a MEMS mirror could be located between lens 230 and opaque material 220 and may be adjustable by controller 238 to direct the focused light from lens 230 to one of the multiple apertures. In some embodiments, the various apertures may have different shapes and sizes. In still other embodiments, the aperture may be defined by an iris (or other type of diaphragm). The iris may be expanded or contracted by controller 238, for example, to control the size or shape of the aperture.

Thus, in some examples, LIDAR device 200 can modify a configuration of system 290 to obtain additional or different information about object 298 and/or the scene. In one example, controller 238 may select a larger aperture in response to a determination that background noise received by system 290 from the scene is currently relatively low (e.g., during night-time). The larger aperture, for instance, may allow system 290 to detect a portion of light 202 that would otherwise be focused by lens 230 outside the aperture. In another example, controller 238 may select a different aperture position to intercept the portion of light 202. In yet another example, controller 238 could adjust the distance between an aperture and light detector array 210. By doing so, for instance, the cross-sectional area of a detection region in array 210 (i.e., cross-sectional area of light 202 at array 210) can be adjusted as well. For example, in FIG. 1A, the detection region of array 110 is indicated by shading on array 110.

However, in some scenarios, the extent to which the configuration of system 290 can be modified may depend on various factors such as a size of LIDAR device 200 or system 290, among other factors. For example, referring back to FIG. 1A, a size of array 110 may depend on an extent of divergence of light 102 from a location of aperture 120a to a location of array 110. Thus, for instance, the maximum vertical and horizontal extents of array 110 may depend on the physical space available for accommodating system 100 within a LIDAR device. Similarly, for instance, an available range of values for the distance between array 110 and aperture 120a may also be limited by physical limitations of a LIDAR device where system 100 is employed. Accordingly, example implementations are described herein for space-efficient noise limiting systems that increase a detection area in which light detectors can intercept light from the scene and reduce background noise.

In some scenarios, where emitter 240 and lens 230 have different physical locations, the scanned representation of object 298 may be susceptible to parallax associated with a spatial offset between the transmit path of light 202 emitted by emitter 240 and the receive path of reflected light 202 incident on lens 230. Accordingly, example implementations are described herein for reducing and/or mitigating the effects of such parallax. In one example, device 200 may alternatively include emitter 240 within system 290 such that the LIDAR transmit and receive paths of LIDAR 200 are co-aligned (e.g., both paths propagate through lens 230).

It is noted that the various functional blocks shown for the components of device 200 can be redistributed, rearranged, combined, and/or separated in various ways different than the arrangement shown.

Figure 3A:
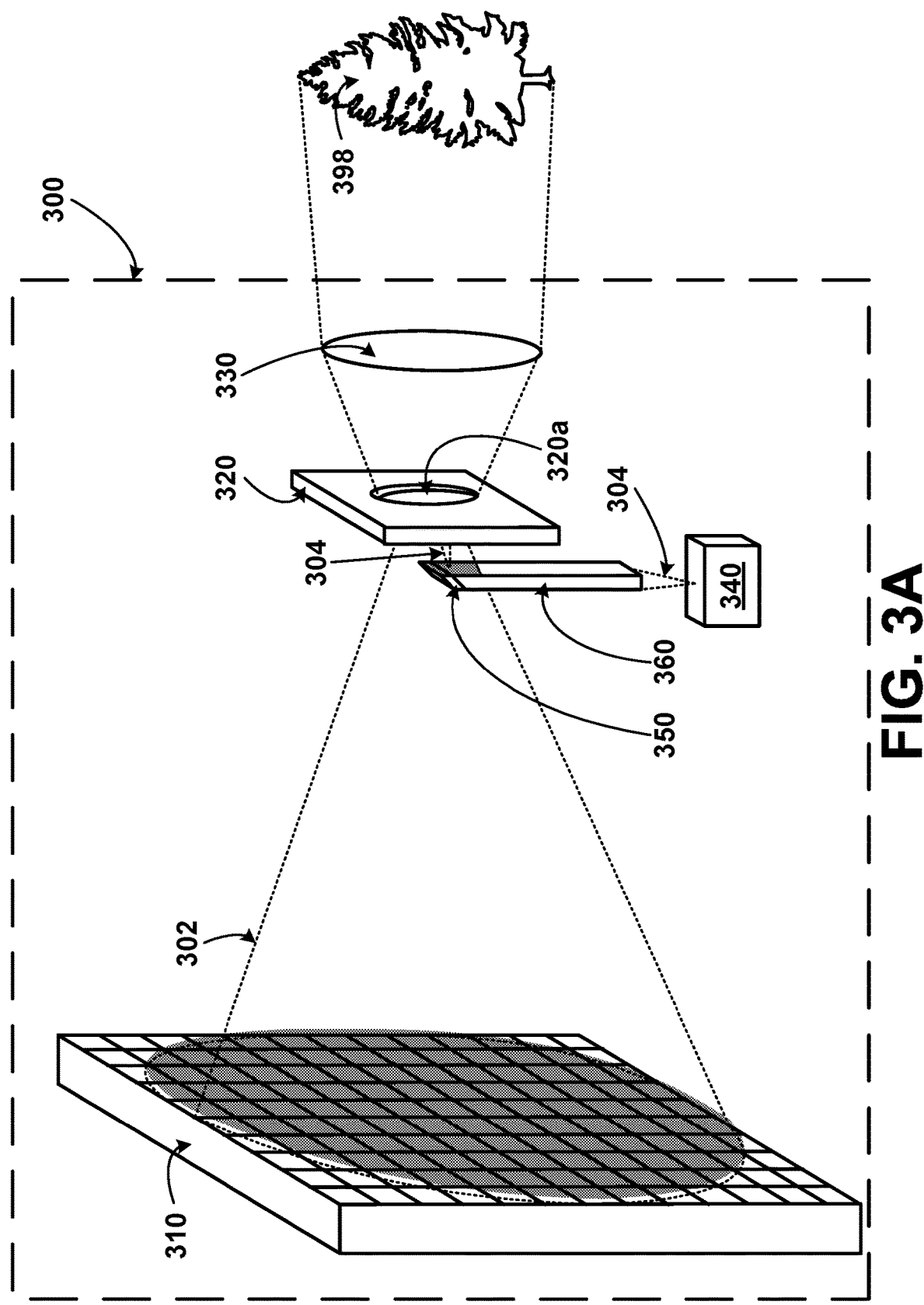
FIG. 3A is an illustration of a system that includes a waveguide, according to example embodiments.

FIG. 3A is an illustration of a system 300 that includes a waveguide 360, according to example embodiments. In some implementations, system 300 can be used with device 200 instead of or in addition to transmitter 240 and system 290. As shown, system 300 may measure light 302 reflected by an object 398 within a scene similarly to, respectively, system 100, light 102, and object 198. Further, as shown, system 300 includes a light detector array 310, an opaque material 320, an aperture 320a, a lens 330, and a light source 340, which may be similar, respectively, to array 110, material 120, aperture 120a, lens 130, and emitter 140. For the sake of example, aperture 320a is shown to have a different shape (elliptical) than a shape of aperture 120a (rectangular). Other aperture shapes are possible.

As shown, system 300 also includes waveguide 360 (e.g., optical waveguide, etc.) arranged along a propagation path of focused light 302 (transmitted through aperture 320a). For example, as shown, a first portion of focused light 302 is projected onto waveguide 360 (e.g., shaded region) and a second portion of focused light 302 is projected onto array 310.

FIG. 3B illustrates a cross-section view of system 300. As best shown in FIG. 3B, at least a portion of focused light 302 may propagate from lens 330 to array 310 without propagating through waveguide 360. As shown in FIGS. 3A and 3B, waveguide 360 is arranged to receive emitted light 304 emitted by light source 340 and projected onto side 360a of waveguide 360.

To that end, waveguide 360 can be formed from a glass substrate (e.g., glass plate, etc.), a photoresist material (e.g., SU-8, etc.), or any other material at least partially transparent to one or more wavelengths of light 304. Further, in some examples, waveguide 360 may be formed from a material that has a different index of refraction than materials surrounding waveguide 360. Thus, waveguide 360 may guide at least a portion of light propagating therein via internal reflection (e.g., total internal reflection, frustrated total internal reflection, etc.) at one or more edges, sides, walls, etc., of waveguide 360. For example, waveguide 360 may guide emitted light 304 incident on side 360a toward side 360b (opposite to side 360a) via internal reflection at sides 360c, 360d, and/or other sides along a length of waveguide 360.

Further, as shown in FIGS. 3A and 3B, system 300 also includes a mirror 350. Mirror 350 may include any reflective material that has reflectivity characteristics suitable for reflecting (at least partially) wavelengths of light 304. To that end, a non-exhaustive list of example reflective materials includes gold, aluminum, other metal or metal oxide, synthetic polymers, hybrid pigments (e.g., fibrous clays and dyes, etc.), among other examples.

Mirror 350 may be tilted (e.g., as compared to an orientation of side 360a) at an offset angle 390 toward side 360c of waveguide 360. For example, an angle 392 between side 360a and side 360c may be greater than angle 390 between mirror 350 and side 360c. In one embodiment, offset or tilting angle 390 of mirror 350 is 45°, and angle 392 between side 360a and side 360c is 90°. However, other angles are possible. In general, mirror 350 is positioned along a path of at least a portion of guided light 304 propagating inside waveguide 360 (received at side 360a and guided toward side 360b). In the embodiment shown, mirror 350 is disposed on side 360b of waveguide 360. For instance, waveguide 360 can be formed such that angle 390 between side 360c and side 360b is different than angle 392 between side 360c and side 360a. Mirror 350 can then be disposed on side 360b (e.g., via chemical vapor deposition, sputtering, mechanical coupling, or another process). However, in other embodiments, mirror 350 can be alternatively disposed inside waveguide 360 (e.g., between sides 360a and 360b).

As noted above, waveguide 360 may guide at least a portion of emitted light 304, via total internal reflection for instance, inside waveguide 360 toward side 360b. For example, as best shown in FIG. 3B, waveguide 360 may extend vertically (e.g., lengthwise) between sides 360a and 360b. In some examples, side 360c may correspond to an interface between a relatively high index of refraction medium (e.g., photoresist, epoxy, etc.) of waveguide 360 and a relatively lower index of refraction medium (e.g., air, vacuum, optical adhesive, glass, etc.) adjacent to side 360c. Thus, for instance, if guided light 304 propagates to side 360c at less than the critical angle (e.g., which may be based on a ratio of indexes of refractions of the adjacent materials at side 360c, etc.), then the guided light incident on side 360c (or a portion thereof) may be reflected back into waveguide 360. Similarly, guided light incident on side 360d at less than the critical angle may also be reflected back into waveguide 360. Thus, waveguide 360 may control divergence of guided light via internal reflection at sides 360c and 360d, for example. Similarly, waveguide 360 may extend through the page in the illustration of FIG. 3B between two opposite sides of waveguide 360 to control divergence of guided light 304.

Thus, at least a portion of emitted light 304 (received at side 360a) may reach tilted side 360b. Mirror 350 (e.g., disposed on side 360b) may then reflect the at least portion of guided light 304 toward side 360c and out of waveguide 360. For example, offset or tilting angle 390 can be selected such that reflected light 304 from mirror 350 propagates toward a particular region of side 360c at greater than the critical angle. As a result, reflected light 304 may be (at least partially) transmitted through side 360c rather than reflected (e.g., via total internal reflection etc.) back into waveguide 360. Further, in the embodiment shown, aperture 320a could be located adjacent to the particular region of side 360c, and may thus transmit light 304 toward lens 330. Lens 330 may then direct light 304 toward a scene.

Emitted light 304 may then reflect off one or more objects (e.g., object 398) in the scene, and return to lens 330 (e.g., as part of light 302 from the scene). Lens 330 may then focus light 302 (including the reflections of the emitted light beams) through aperture 320a.

As best shown in FIG. 3A, a first portion of focused light 302 may be focused onto waveguide 360 (e.g., shaded region). In some instances, the first portion of focused light 302 may propagate through transparent regions of waveguide 360 (e.g., from side 360c to side 360d and then out of waveguide 360 toward array 310, without being intercepted by mirror 350. However, in some examples, the first portion of focused light 302 may be at least partially intercepted by mirror 350 and then reflected away from array 310 (e.g., guided inside waveguide 360, etc.). To mitigate this, in some implementations, mirror 350 can be configured to have a small size relative to aperture 320a and/or a projection area of focused light 302 at the location of mirror 350. In these examples, a larger portion of focused light 302 may propagate adjacent to mirror 350 (and/or waveguide 360) to continue propagating toward array 310. Alternatively, mirror 350 can be formed from a partially or selectively reflective material (e.g., half mirror, dichroic mirror, etc.) that transmits at least a portion of focused light 302 incident thereon through mirror 350 for propagation toward array 310.

As noted above, system 300 can be used with LIDAR device 200, in addition to or instead of transmitter 240 and system 290. In such implementations, system 300 may emit light 304 from a same location (e.g., aperture 320a) as the location at which system 300 receives focused light 302 (e.g., aperture 320a). Because the transmit path of emitted light 304 and the receive path of focused light 302 are co-aligned (e.g., both paths are from the point-of-view of aperture 320a, system 300 may be less susceptible to the effects of parallax. In turn, a LIDAR device that employs system 300 could generate a representation of the scanned scene (e.g., data point cloud, etc.) that is less susceptible to errors related to parallax.

It is noted that the sizes, positions, orientations, and shapes of the components and features of system 300 shown are not necessarily to scale, but are illustrated as shown only for convenience in description. It is also noted that system 300 may include fewer or more components than those shown, and one or more of the components shown could be arranged differently, physically combined, and/or physically divided into separate components.

In a first embodiment, the relative arrangement of array 310, aperture 320a, and waveguide 360 can vary. In a first example, opaque material 320 (and thus aperture 320a) can be alternatively disposed between array 310 and waveguide 360. For instance, waveguide 360 can be positioned adjacent to an opposite side of opaque material 320, while still transmitting emitted light 304 along a path that overlaps the propagation path of focused light 302 transmitted through aperture 320a. In a second example, array 310 can be alternatively disposed between waveguide 360 and opaque material 320. For instance, array 310 may include an aperture (e.g., cavity, etc.) through which emitted light 304 propagates toward aperture 320a (and lens 330).

In a second embodiment, array 310 can be replaced by a single light detector rather than a plurality of light detectors.

In a third embodiment, a distance between waveguide 360 and aperture 320a can vary. In one example, waveguide 360 can be disposed along (e.g., in contact with, etc.) opaque material 320. For instance, side 360c may be substantially coplanar with or proximal to aperture 320a. However, in other examples (as shown), waveguide 360 can be positioned at a distance (e.g., gap, etc.) from opaque material 320 (and aperture 320a).

In a fourth embodiment, system 300 could optionally include an actuator that moves lens 330, opaque material 320, and/or waveguide 360 to achieve a particular optical configuration (e.g., focus configuration, etc.) while scanning the scene. More generally, optical characteristics of system 300 can be adjusted according to various applications of system 300.

In a fifth embodiment, the position and/or orientation of aperture 320a can vary. In one example, aperture 320a can be disposed along the focal plane of lens 330. In another example, aperture 320a can be disposed parallel to the focal plane of lens 330 but at a different distance to lens 330 than the distance between the focal plane and lens 330. In yet another example, aperture 320a can be arranged at an offset orientation relative to the focal plane of lens 330. For instance, system 300 can rotate (e.g., via an actuator) opaque material 320 (and/or waveguide 360) to adjust the entry angle of light 302 and/or 304 into aperture 320a. By doing so, for instance, a controller (e.g., controller 238) can further control optical characteristics of system 300 depending on various factors such as lens characteristics of lens 330, environment of system 300 (e.g., to reduce noise/interference arriving from a particular region of the scanned scene, etc.), among other factors.

In a sixth embodiment, waveguide 360 can alternatively have a cylindrical shape or any other shape. Additionally, in some examples, waveguide 360 can be implemented as a rigid structure (e.g., slab waveguide) or as a flexible structure (e.g., optical fiber).

FIG. 4A illustrates a first cross-section view of a system 400 that includes multiple waveguides 460, 462, 464, 466, according to example embodiments. For purposes of illustration, FIG. 4A shows an x-y-z axis, in which the z-axis extends through the page. System 400 may be similar to systems 100, 290, and/or 300, and can be used with device 200 instead of or in addition to system 290 and transmitter 240. For example, the side of waveguide 460 along the surface of the page may be similar to side 360c of waveguide 360.

As shown, system 400 includes an optical element 434; a transmitter 440 that includes one or more light sources similar to light source 340; a plurality of mirrors 450, 452, 454, 456, each of which may be similar to mirror 350; and a plurality of waveguides 460, 462, 464, 466, each of which may be similar to waveguide 360.

Optical element 434 may be interposed between transmitter 440 and waveguides 460, 462, 464, 466, and may be configured to redirect, focus, collimate, and/or otherwise adjust optical characteristics of emitted light 404. To that end, optical element 434 may comprise any combination of optical elements, such as lenses, mirrors, cylindrical lenses, light filters, etc.

In one example, optical element 434 may comprise a cylindrical lens, and/or other optical element configured to (at least partially) collimate and/or direct light beams 404 (e.g., emitted by transmitter 440) as light portions 404a, 404b, 404c, 404d toward waveguides 460, 462, 464, 466. In this example, optical element 434 may transmit a relatively larger amount of energy from emitted light portion 404a into waveguide 460 by collimating the light beams. Alternatively or additionally, in this example, optical element 434 may direct emitted light portion 404a into waveguide 460 at a particular angle of entry (e.g., less than the critical angle of waveguide 460, etc.) that is suitable for light beam(s) 404a to be guided inside waveguide 460 (e.g., via total internal reflection, etc.).

In the embodiment shown, optical element 434 can be implemented as a single optical element interposed between transmitter 440 and waveguides 460, 462, 464, 466. For example, optical element 434 can be implemented as an optical fiber that is arranged as a cylindrical lens to at least partially collimate light beams 404a, 404b, 404c, 404d. In other embodiments, optical element 434 can be alternatively implemented as multiple physically separate optical elements (e.g., multiple cylindrical lenses), among other possibilities.

Transmitter 440 may be configured to emit light 404 similarly to, respectively, light source 340 and emitted light 304. To that end, transmitter 440 may include one or more light sources (e.g., laser bars, LEDs, diode lasers, etc.).

In a first embodiment, transmitter 440 may comprise a single light source that transmits light 404. For example, each of light portions 404a, 404b, 404c, 404d may originate from a single light source. With this arrangement, for example, a single light source can be used to drive four different transmit channels of system 400.

In a second embodiment, a given light source in transmitter 440 can be used to drive fewer or more than four transmit channels. For example, transmitter 440 may include a first light source that provides light portions 404a, 404b, and a second light source that provides light portions 404c, 404d. In one implementation, a single light source can be used to drive eight transmit channels.

In a third embodiment, transmitter 440 may include a separate light source for driving each transmit channel. For example, a first light source may emit light portion 404a, a second light source may emit light portion 404b, a third light source may provide light portion 404c, and a fourth light source may emit light portion 404d.

Regardless of the number of light sources in transmitter 440, emitted light beams 404a, 404b, 404c, 404d may then propagate along separate transmit paths toward an environment of system 400. By way of example, light beam(s) 404a could be transmitted through a first side of waveguide 460 (e.g., similar to side 360a of waveguide 360). Waveguide 460 may then guide light 404a in a lengthwise direction of waveguide 460 toward a second opposite side (e.g., similar to side 360b) of waveguide 460, where mirror 450 is located. Mirror 450 may then reflect guided light 404a out of the page (along z-axis), and toward a scene. Thus, light portion 404a may define a first transmit channel (e.g., LIDAR transmit channel, etc.) that is associated with the transmit path described above.

Similarly, light beam(s) 404b could define a second transmit channel associated with a transmit path defined by waveguide 462 and mirror 452; light beam(s) 404c could define a third transmit channel associated with a transmit path defined by waveguide 464 and mirror 454; and light beam(s) 404d could define a fourth transmit channel associated with a transmit path of light defined by waveguide 466 and mirror 456. With this arrangement, system 400 may emit a pattern of light beams toward a scene.

Figure 4B:
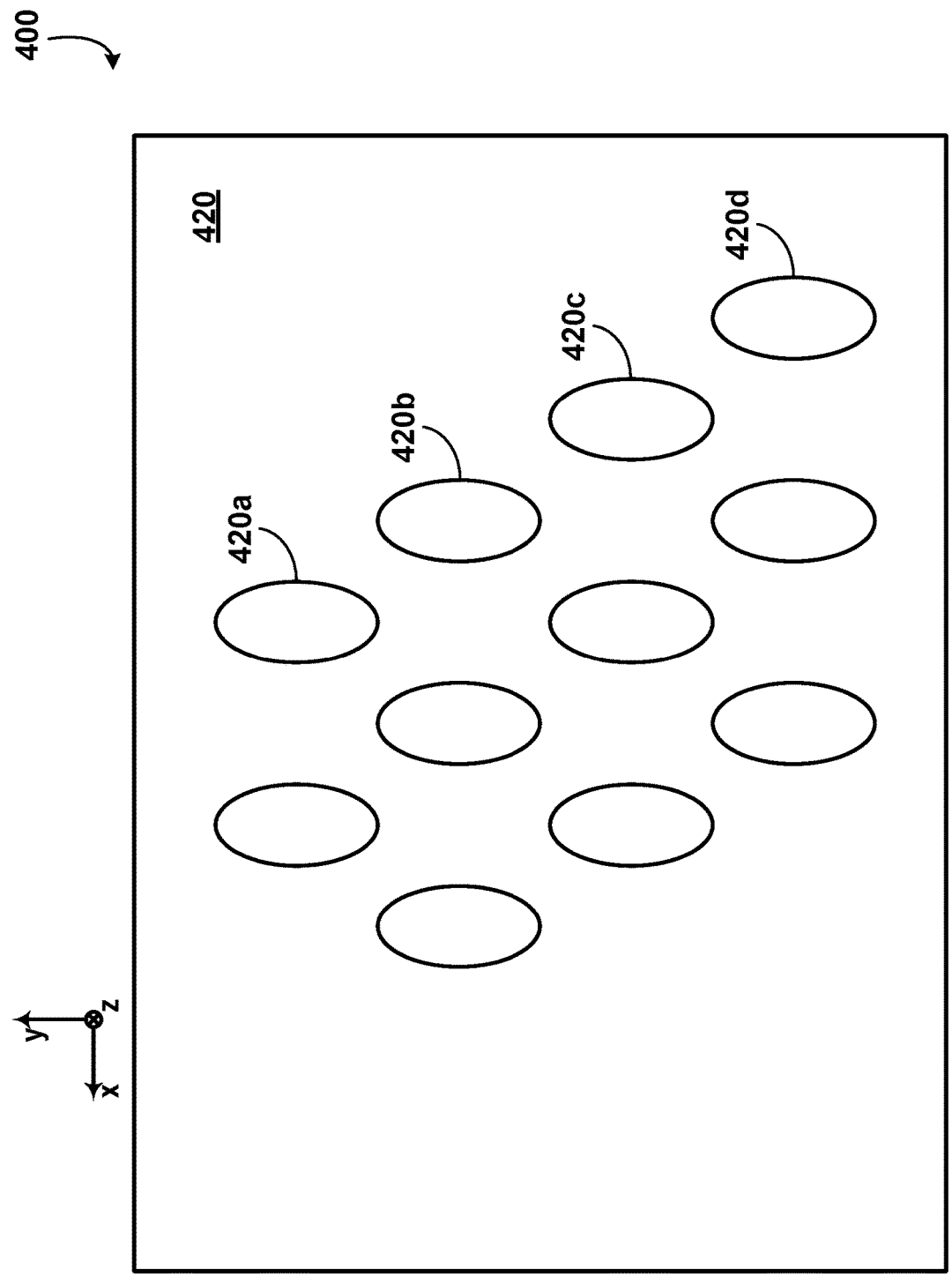
FIG. 4B illustrates a second cross-section view of the system of FIG. 4A.

FIG. 4B illustrates a second cross-section view of system 400, where the z-axis is also pointing out of the page. As shown in FIG. 4B, system 400 also includes an opaque material 420, which may be similar to opaque material 320 of system 300. Opaque material 420 may define a plurality of apertures, exemplified by apertures 420a, 420b, 420c, and 420d, each of which may be similar to aperture 320a. For example, aperture 420a may be aligned (e.g., adjacent, overlapping, etc.) with an output end of waveguide 460 (e.g., where light 404a exits waveguide 460). For example, aperture 420a may overlap mirror 450 in the direction of the z-axis. Similarly, aperture 420b can be aligned with an output end of waveguide 462, aperture 420c could be aligned with an output end of waveguide 464, and aperture 420d could be aligned with an output end of waveguide 466. Thus, each of apertures 420a, 420b, 420c, 420d may be co-aligned with respective transmit paths of emitted light portions 404a, 404b, 404c, 404d, and may thus define positions of the four transmit channels of system 400.

Additionally, in some examples, focused light from the scene (e.g., propagating into the page in FIG. 4B) may be projected onto opaque material 420 similarly to focused light 302 incident on opaque material 320. To that end, system 400 may provide multiple receive channels associated with respective portions of the focused light projected on opaque material 420 at the respective positions of apertures 420a, 420b, 420c, 420d.

For example, a first portion of the focused light transmitted through aperture 420a could be intercepted by a first light detector associated with a first receive channel, a second portion of the focused light transmitted through aperture 420b could be intercepted by a second light detector associated with a second receive channel, a third portion of the focused light transmitted through aperture 420c could be intercepted by a third light detector associated with a third receive channel, and a fourth portion of the focused light transmitted through aperture 420d could be intercepted by a fourth light detector associated with a fourth receive channel.

With this arrangement, system 400 can obtain a one-dimensional (1D) image (e.g., horizontal arrangement of pixels or LIDAR data points, etc.) of the scene. For instance, a first pixel or data point in the 1D image could be based on data from the first receive channel associated with aperture 420a, and a second pixel in the 1D image could be based on data from the second receive channel associated with aperture 420b. Additionally, with this arrangement, each transmit channel may be associated with a transmit path that is co-aligned (through a respective aperture) with a receive path associated with a corresponding receive channel. Thus, system 400 can mitigate the effects of parallax by providing pairs of co-aligned transmit/receive channels defined by the locations of apertures 420a, 420b, 420c, 420d.

Although waveguides 460, 462, 464, 466 are shown in FIG. 4A to be in a horizontal (e.g., along x-y plane) arrangement, in some examples, system 400 may include waveguides in a different arrangement. In a first example, the waveguides can alternatively or additionally be arranged vertically (e.g., along y-z plane) to obtain a vertical 1D image (or line of LIDAR data points) representation of the scene. In a second example, the waveguides can alternatively be arranged both horizontally and vertically (e.g., as a two-dimensional grid) to obtain a two-dimensional (2D) image (or 2D grid of LIDAR data points) of the scene.

Figure 4C:
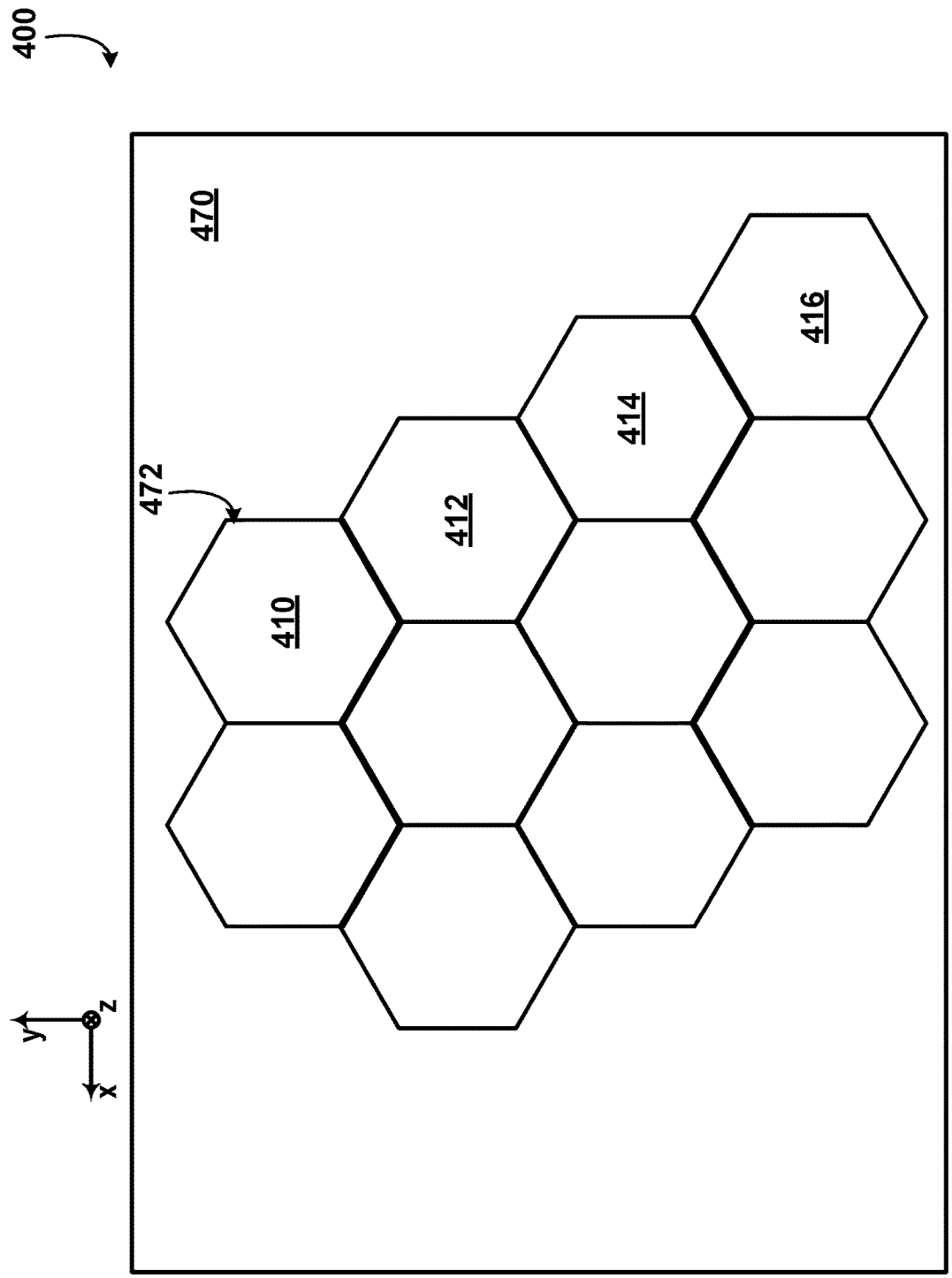
FIG. 4C illustrates a third cross-section view of the system of FIG. 4A.

FIG. 4C illustrates a third cross section view of system 400, in which the z-axis is also pointing out of the page. For example, one or more of the components of system 400 shown in FIG. 4B may be positioned above or below (e.g., along z-axis) one or more of the components shown in FIG. 4A.

As shown, system 400 also includes a support structure 470 that mounts a plurality of receivers, exemplified by 410, 412, 414, 418. Further, as shown, system 400 also includes one or more light shields 472.

Each of receivers 410, 412, 414, and 416 may include one or more light detectors similar to the light detectors in any of arrays 110, 210, and/or 310. Receivers 410, 412, 414, 416 may be arranged to intercept focused light that is transmitted, respectively, through apertures 420a, 420b, 420c, 420d (shown in FIG. 4B). In one embodiment, receivers 410, 412, 414, 416 may be positioned to overlap (e.g., in the direction of the z-axis), respectively, mirrors 450, 452, 454, 456 (i.e., the output ends of waveguides 460, 462, 464, 463). In some examples, each of receivers 410, 412, 414, 416 may include a respective array of light detectors connected in parallel to one another (e.g., SiPM, MPCC, etc.). In other examples, each receiver may include a single light detector.

Support structure 470 may include a printed circuit board (PCB) to which the light detectors of receivers 410, 412, 414, 416 are mounted. By way of example, a first group of light detector(s) may define a first receive channel associated with receiver 410; a second adjacent group may define a second receive channel associated with receiver 412; a third adjacent group may define a third receive channel associated with receiver 414; and a fourth group may define a fourth receive channel associated with receiver 416. Alternatively or additionally, structure 470 may include a different type of solid material that has material characteristics suitable for supporting receivers 410, 412, 414, 416.

Light shield(s) 472 may comprise one or more light absorbing materials (e.g., black carbon, black chrome, black plastic, etc.) arranged around receivers 410, 412, 414, 416. To that end, for example, light shield(s) 472 may prevent (or reduce) light from external sources (e.g., ambient light, etc.) from reaching receivers 410, 412, 414, 416. Alternatively or additionally, for example, light shield(s) 472 can prevent or reduce cross-talk between receive channels associated with receivers 410, 412, 414, 416. Thus, in this example, light shield(s) 472 may be configured to optically separate receivers 410, 412, 414, 416, etc., of system 400 from one another. As shown, for instance, light shield(s) 472 may be shaped in a honeycomb structure configuration, where each cell of the honeycomb structure shields light detectors of a first receiver (e.g., receiver 410) from light propagating toward light detectors in a second adjacent receiver (e.g., receiver 412). With this arrangement, system 400 may provide for space-efficient placement of multiple arrays of light detectors (e.g., along a surface of structure 470) that are each aligned with a respective waveguide in system 400. Other shapes and/or arrangements of light shield(s) 472 (e.g., rectangular-shaped cells, other shapes of cells, etc.) are possible.

Figure 4D:
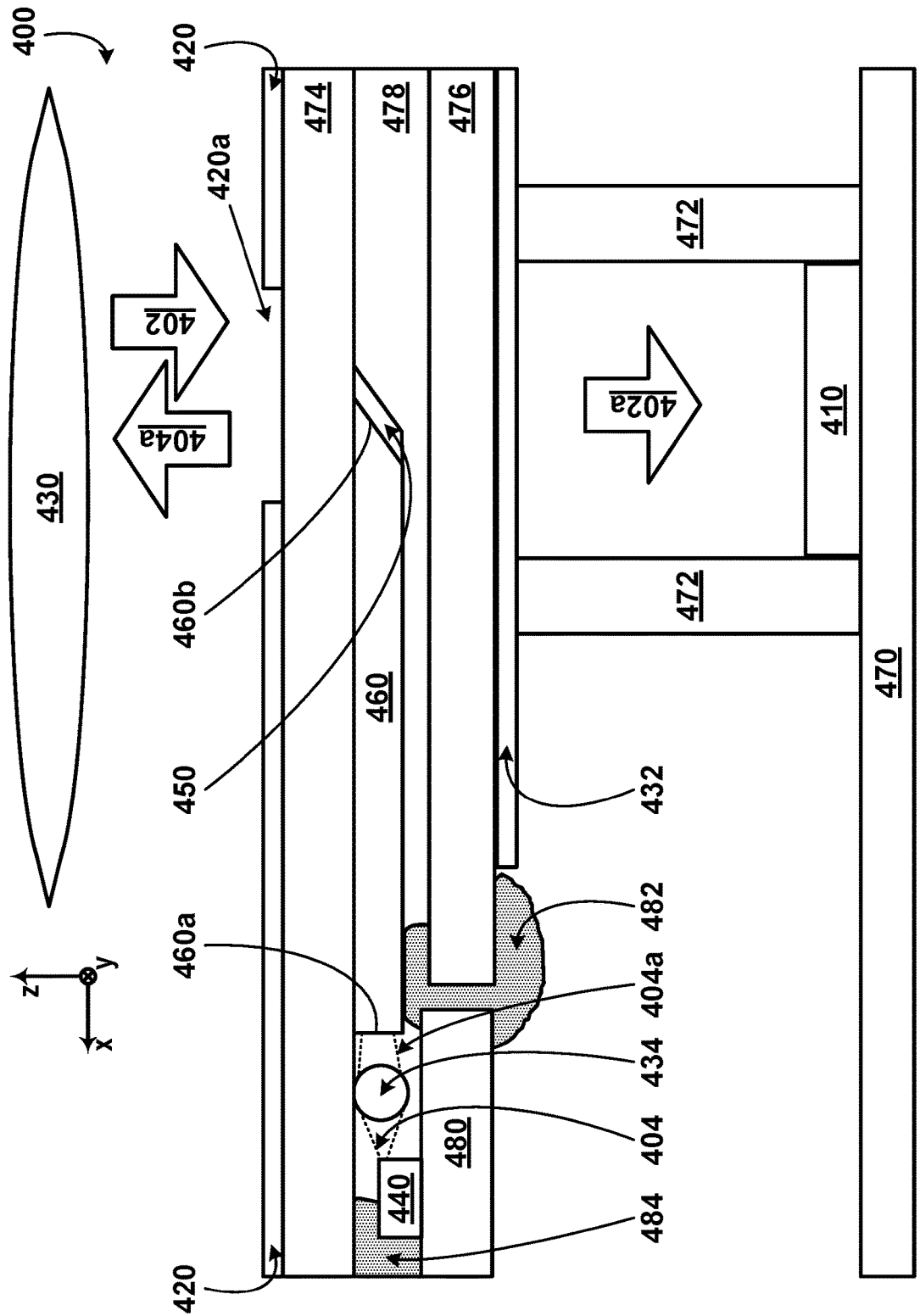
FIG. 4D illustrates a fourth cross-section view of the system of FIG. 4A.

FIG. 4D illustrates a fourth cross-section view of system 400, where the y-axis is pointing through of the page. As shown, waveguide 460 includes sides 460a and 460b which may be similar, respectively, to sides 360a and 360b of waveguide 360. Further, as shown, system 400 also includes a lens 430, a light filter 432, a plurality of substrates 474, 476, a material 478 disposed between substrates 474 and 476, a support structure 480, and a plurality of adhesives 482, 484.

Lens 430 may be similar to lens 330. For example, lens 430 may focus light from a scene toward opaque material 420. Respective portions of focused light 402 may then be transmitted, respectively, through apertures 420a, 420b, 420c, 420d (shown in FIG. 4B). In FIG. 4D for example, a portion 402a of focused light 402 may be transmitted through aperture 420a onto waveguide 460 and receiver 410. As shown in FIG. 4D, waveguide 460 may be at a first distance to lens 430, and receiver 410 may be at a second (greater) distance to lens 430. Further, as shown in FIG. 4D, emitted light portion 404a may be reflected by mirror 450 through aperture 420a and toward lens 430.

Light filter 432 may be similar to light filter 132. For example, light filter 432 may include one or more devices configured to attenuate wavelengths of light 402 (e.g., other than wavelengths of emitted light 404, etc.). In some examples, substrate 476 (and filter 434) may extend horizontally (through the page; along the y-axis) to similarly attenuate light propagating toward waveguides 462, 464, and 466 (shown in FIG. 4A). As shown in FIG. 4D, filter 432 may be disposed on a given side of substrate 476 (e.g., between substrate 476 and receiver 410).

In another embodiment, filter 432 may be alternatively disposed on the opposite side of substrate 476 (between substrates 474, 476), or at any other location in system 400 along a propagation path of light 402 (i.e., prior to detection of light 402a at receiver 410). In yet another embodiment, substrate 476 can be formed from a material that has light filtering characteristics of filter 432. Thus, in this embodiment, filter 432 can be omitted from system 400 (i.e., the functions of filter 432 can be performed by substrate 476). In still another embodiment, filter 432 can be implemented as multiple (e.g., smaller) filters that are each disposed between substrate 476 and a respective one of the receivers. For instance, a first filter can be used to attenuate light propagating toward receiver 410, and a second separate filter can be used to attenuate light propagating toward receiver 412, etc. Referring back to FIG. 4C by way of example, each filter can be disposed in (or adjacent to) each of cells 410, 412, 414, 416, etc. of the honeycomb structure of light shield 472.

Substrates 474 and 476 can be formed from any transparent material configured to transmit at least some wavelengths of light (e.g., wavelengths of light 404, etc.) through the respective substrates. In one embodiment, substrates 474 and 476 may include glass wafers.

Material 478 may be formed from any optical material that has optical characteristics suitable for defining an optical medium around waveguide 460. For example, material 478 may include a gas, liquid, or solid material having a lower index of refraction than an index of refraction of waveguide 460 (and waveguides 462, 464, 466). In some examples, material 478 may comprise an optical adhesive that couples substrates 474 and 476 to one another. In these examples, material 478 may be configured to support waveguide 460 in a particular position relative to lens 430 (and/or aperture 420a).

As noted above, in some examples, material 478 may comprise an adhesive material that mechanically attaches two or more components of system 400 to one another. In one example, material 478 (configured as an optical adhesive) can be disposed between two particular components in a liquid form, and may then cure to a solid form to attach the two particular components to one another. To that end, example optical adhesives may include photopolymers or other polymers that can transform from a clear, colorless, liquid form into a solid form (e.g., in response to exposure to ultraviolet light or other energy source).

As shown, material 478 may be disposed between and in contact with substrates 476 and 478. Additionally, as shown, material 478 is in contact with one or more sides of waveguide 460. As noted above, material 478 may have a lower index of refraction than the material of waveguide 460. The difference between the indexes of refraction at walls, sides, etc., of waveguide 460 adjacent to material 478 may cause guided light inside waveguide 460 to internally reflect back into waveguide 460 at the interface(s) between waveguide 460 and material 478. In one implementation, the waveguides of system 400 can be disposed on substrate 474, then material 478 can be disposed on substrate 474 and on the waveguides to support and/or maintain the waveguides in a particular relative arrangement, and then substrate 476 can then be disposed on material 478 to attach substrate 474 with substrate 476.

Support structure 480 may be formed from similar materials as structure 470 (e.g., PCB, solid platform, etc.). As shown, structure 480 can be configured as a platform that mounts transmitter 440. For example, structure 480 can be implemented as a PCB on which one or more light sources (e.g., laser bar, etc.) of transmitter 440 are mounted. To that end, structure 480 could optionally include wiring or other circuitry for transmitting power and signals to operate transmitter 440. In some examples, structure 470 may similarly include wiring and/or circuitry for transmitting power and/or communicating signals with receiver 410 to operate receiver 410.

Adhesives 482, 484 can be formed from any adhesive material suitable for attaching or otherwise coupling at least two components of system 400 to one another. A non-exhaustive list of example adhesive materials includes non-reactive adhesives, reactive adhesives, solvent-based adhesives (e.g., dissolved polymers, etc.), polymer dispersion adhesives (e.g., polyvinyl acetate, etc.), pressure-sensitive adhesives, contact adhesives (e.g., rubber, polycholoroprene, elastomers, etc.), hot adhesives (e.g., thermoplastics, ethylene-vinyl acetates, etc.), multi-component adhesives (e.g., thermosetting polymers, polyester resin—polyurethane resin, polypols—polyurethane resin, acrylic polymers—polyurethane resins, etc.), one-part adhesives, ultraviolet (UV) light curing adhesives, light curing materials (LCM), heat curing adhesives (e.g., thermoset epoxies, urethanes, polymides, etc.), and moisture curing adhesives (e.g., cyanoacrylates, urethanes, etc.), among others.

In some examples, adhesives 482, 484 may comprise optical adhesive materials (e.g., materials that are transparent to at least some wavelengths of light 404), similarly to material 478. In other examples, adhesives 482, 484 may comprise adhesive materials that are opaque and/or otherwise attenuate or prevent at least some wavelengths of light.

The assembly of components between (and including) substrates 474 and 476 may together provide a "chip" assembly of the waveguides. For instance, substrate 474 may define a top side of the chip assembly of system 400, and substrate 476, adhesive 482, and structure 480 may together define a bottom side of the chip assembly.

Additionally, in the example shown, optical element 434 may be disposed on a same surface of substrate 474 on which waveguide 460 is mounted. However, in other examples, optical element 434 could be disposed on a different surface inside the chip assembly. In a first example, optical element 434 could be mounted on structure 480. In a second example, optical element 434 could be mounted on and/or attached to side 460a of waveguide 460. In a third example, although not shown, substrate 476 could alternatively extend further horizontally (e.g., along x-axis) to overlap the location of optical element 434 (e.g., structure 480 could be narrower horizontally, etc.). In this example, optical element 434 could be disposed on substrate 476. In a fourth example, optical element 434 could alternatively be disposed on another support structure (not shown) inside the chip assembly. Other examples are possible.

Additionally, transmitter 440 could also be included inside the chip assembly. For example, as shown, adhesive 482 may couple (e.g., attach) transmitter 440 and/or structure 480 to substrate 476. Further, for example, adhesive 484 may couple or attach structure 480 (and/or transmitter 440) to substrate 474.

By disposing transmitter 440 and optical element 434 inside the chip assembly, system 400 could shield and/or prevent damage to these optical components. Additionally, for instance, the chip assembly of system 400 could support and/or maintain these optical components in a particular relative arrangement with respect to one another. By doing so, for instance, system 400 may be less susceptible to calibration and/or misalignment errors that would occur if the particular relative arrangement of these components is inadvertently changed (e.g., if one of these components is moved differently than the other components).

As best shown in FIG. 4A, in some examples, waveguides 462, 464, 466 can be disposed on substrate 474 similarly to waveguide 460 (e.g., arranged horizontally in the x-y plane). Further, in some examples, system 400 may include additional (or fewer) waveguides in the same horizontal plane (e.g., disposed on substrate 474, etc.). Further, referring back to FIG. 4C, these additional waveguides can similarly be aligned respective cells of the honeycomb-shaped light shield structure 472.

In some examples, system 400 may include waveguides mounted along a different horizontal plane than the plane in which waveguides 460, 462, 464, 466 are located. The waveguides in the different horizontal plane could be aligned with additional receivers of system 400. The additional receivers, for instance, may be disposed within respective cells of the honeycomb-shaped light shield(s) 472 shown in FIG. 4C. Further, opaque material 420 may include additional apertures aligned with these additional waveguides. With this arrangement, system 400 can image additional regions of the focal plane of lens 430 to provide a two-dimensional (2D) scanned image (or 2D grid of LIDAR data points). Alternatively or additionally, the entire assembly of system 400 can be rotated or moved to generate the 2D scanned image of the scene.

In one example, opaque material 420 may define a grid of apertures along the focal plane of lens 430, and each aperture in the grid may transmit light for a receive channel associated with a respective portion of the FOV of lens 430. In one embodiment, opaque material 420 may comprise four rows of 64 apertures, where each row of horizontally (e.g., along y-axis) adjacent apertures is separated by a vertical offset (e.g., along z-axis) from another row of apertures. In this embodiment, system 400 could thus provide 4*64=256 receive channels, and 256 co-aligned transmit channels. In other embodiments, system 400 may include a different number of transmit/receive channels (and thus a different number of associated apertures).

In some implementations, system 400 can be rotated about an axis while scanning a surrounding environment using the multiple transmit and receive channels. Referring back to FIG. 2 for example, system 400 can be mounted on a rotating platform, similar to platform 294, that rotates about an axis (e.g., using actuator 296, etc.) while system 400 is transmitting light pulses and detecting reflections thereof (via apertures 420a, 420b, 420c, 420d, etc.). In this example, a controller (e.g., controller 238) or other computer system can receive LIDAR data collected using the co-aligned transmit/receive channels of system 400, and then process the LIDAR data to generate a 3D representation of the environment of system 400. In one implementation, system 400 can be employed in a vehicle, and the 3D representation may be used to facilitate various operations of the vehicle (e.g., detect and/or identify objects around the vehicle, facilitate autonomous navigation of the vehicle in the environment, display the 3D representation to a user of the vehicle via a display, etc.).

It is noted that the various sizes, shapes, and positions (e.g., distance between adjacent waveguides, etc.) shown in FIGS. 4A-4D for the various components of system 400 are not necessarily to scale but are illustrated as shown only for convenience in description.

Figure 5:
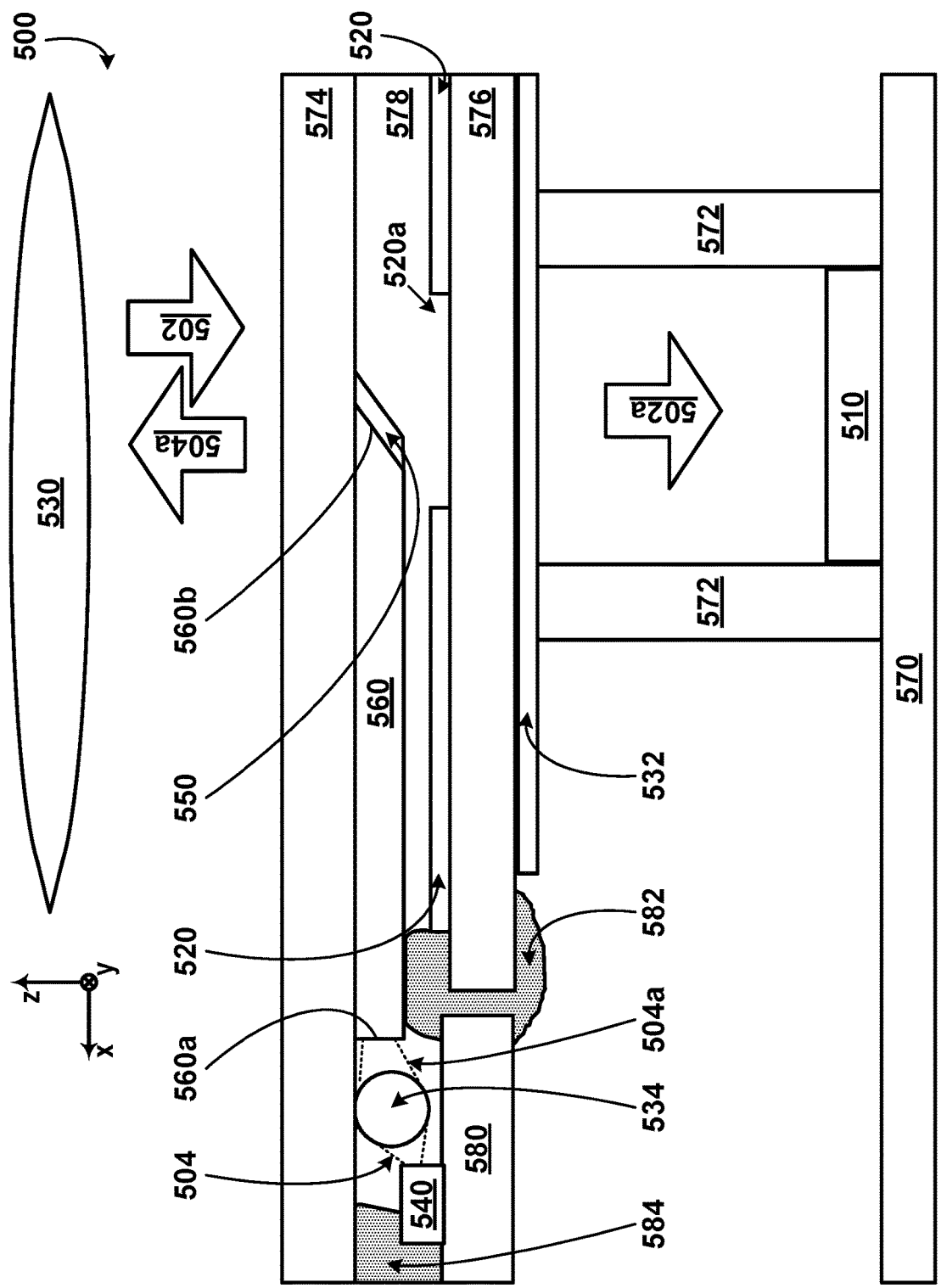
FIG. 5 illustrates a cross-section view of another system that includes a waveguide, according to example embodiments.

FIG. 5 illustrates a cross-section view of another system 500, according to example embodiments. System 500 may be similar to systems 100, 290, 300, and/or system 400, for example. For convenience in description, FIG. 5 shows an x-y-z axis, where the y-axis is pointing out of the page. To that end, the cross-section view of system 500 shown in FIG. 5 may be similar to the cross-section view of system 400 shown in FIG. 4C.

As shown in FIG. 5, system 500 includes a receiver 510, an opaque material 520, an aperture 520a, a light filter 532, an optical element 534, a transmitter 540, a mirror 550, a waveguide 560 having sides 560a and 560b, a support structure 570, one or more light shields 572, substrates 574, 576, material 578, support structure 580, and adhesives 582, 584, which may be similar, respectively, to receiver 410, opaque material 420, aperture 420a, light filter 432, optical element 434, transmitter 440, mirror 450, waveguide 460, sides 460a and 460b, support structure 470, light shield(s) 472, substrates 474, 476, material 578, support structure 480, and adhesives 482, 484 of system 400. To that end, focused light 502, focused light portion 502a, emitted light 504, and emitted light portion 504a, may be similar, respectively, to focused light 402, focused light portion 402a, emitted light 404, and emitted light portion 404a.

As noted above, example systems herein may employ various arrangements of a lens, waveguide, and light detector(s) to define co-aligned transmit/receive paths.

In a first example arrangement, system 400 (as best shown in FIG. 4D) includes aperture 420a interposed between waveguide 460 and lens 430. In this example, both emitted light 404a and focused light 402a are transmitted through the same aperture 420a, and may thus be associated with co-aligned transmit/receive paths.

In a second example arrangement, system 500 (as shown in FIG. 5) includes aperture 520a interposed between waveguide 560 and receiver 510. Thus, in system 500, focused light 502a is transmitted through aperture 520a, but emitted light 504a is not transmitted through aperture 520a. However, in system 500, an output end of waveguide 560 (e.g., where mirror 550 is located) may be interposed between aperture 520a and lens 530 (e.g., along the propagation path of focused light 502a) to direct emitted light 504a from a same or similar point-of-view as focused light 502a that is transmitted through aperture 520a. Thus, the transmit path of emitted light 504a and the receive path of focused light 502a may also be co-aligned (even though emitted light 504a and focused light 502a are not transmitted through the same aperture).

In a third example arrangement, receiver 510 could alternatively be disposed between waveguide 560 and opaque material 520. For instance, receiver 510 may include a cavity through which emitted light 504a can propagate toward aperture 520a.

In a fourth example arrangement, receiver 510 and a waveguide 560 could alternatively be positioned at a same distance to lens 530. Referring back to FIG. 3A for instance, one or more light detectors of array 310 (e.g., one or more columns, rows, or other group of light detectors) could be replaced with waveguide 360 such that mirror 350 directs emitted light 304 toward the same aperture 320a used for transmitting focused light 302 toward array 310.

In a fifth example arrangement, substrate 576 can be alternatively omitted from system 500, and opaque material 520 (e.g., pinhole array) can be instead disposed on filter 532 or on light shield(s) 572. Referring back to FIG. 4B for example, the aperture array defined by opaque material 420 can be alternatively disposed onto the honeycomb baffle structure of light shield(s) 472 shown in FIG. 4C.

Other example arrangements are possible. Thus, in various examples, system 500 may include more, fewer, or different components than those shown. Further, the arrangement of the various components may vary without departing from the scope of the present disclosure.

It is noted that some of the components of system 500 are omitted from the illustration of FIG. 5 for convenience in description. For example, although not shown, system 500 may also include multiple waveguides, and/or one or more other components such as any of the components of systems 100, 290, 300, 400, and/or device 200. For instance, system 500 may include multiple waveguides disposed on substrate 574 in a horizontal arrangement (along x-y plane), similarly to waveguides 460, 462, 464, 466 of system 400.

Figure 6:
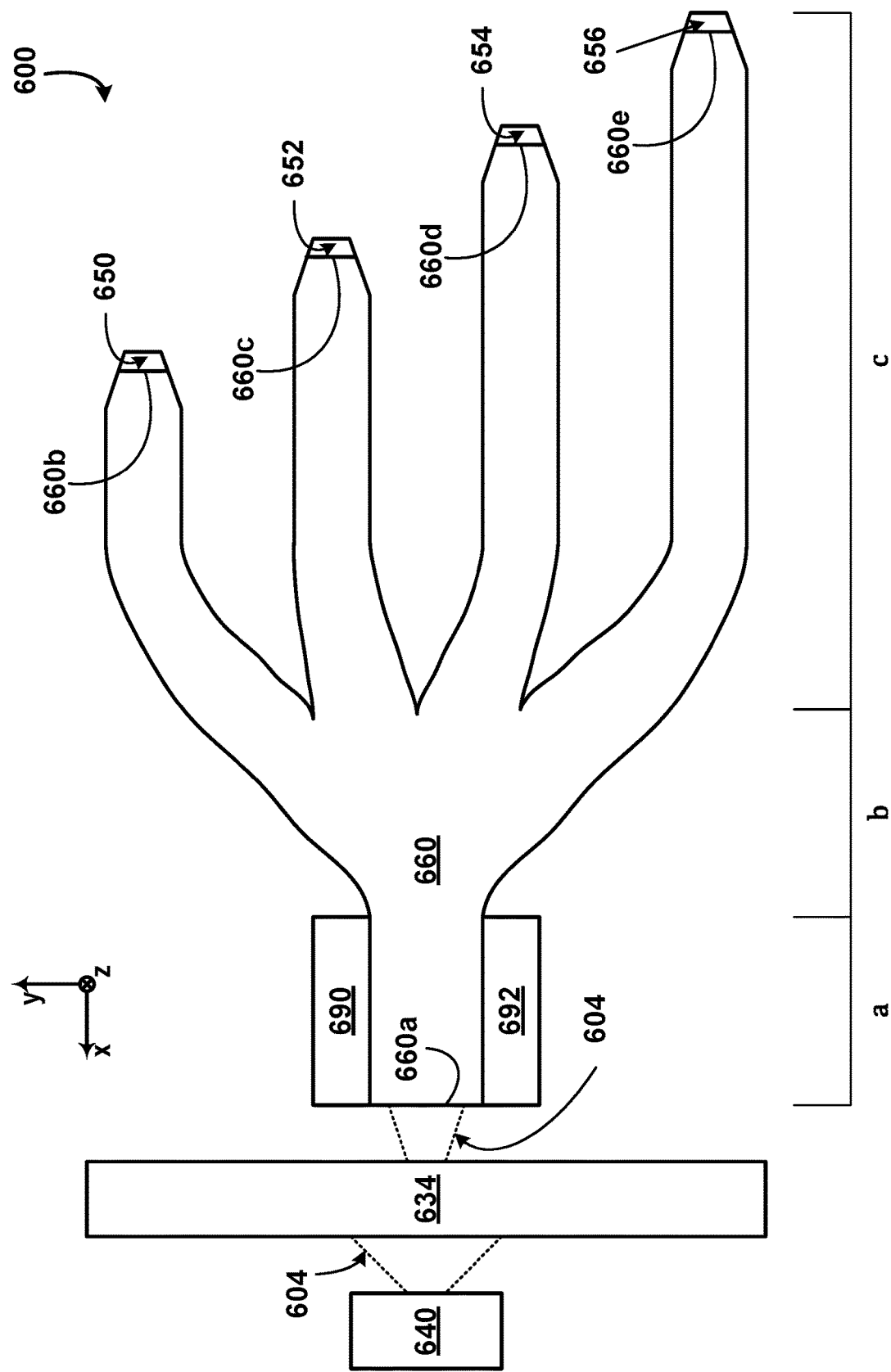
FIG. 6 illustrates a cross-section view of yet another system that includes a waveguide, according to example embodiments.

FIG. 6 illustrates another system 600, according to example embodiments. System 600 may be similar to systems 100, 290, 300, 400, and/or 500, and could be used with LIDAR device 200 instead of or in addition to transmitter 240 and system 290. For convenience in description, FIG. 6 shows an x-y-z axis, where the z-axis is pointing through the page. To that end, the cross-section view of system 600 shown in FIG. 6 may be similar to the cross-section view of system 400 shown in FIG. 4A.

As shown, system 600 includes a transmitter 640, an optical element 634, a plurality of mirrors 650, 652, 654, 656, and a waveguide 660, which may be similar, respectively, to transmitter 440, optical element 434, mirrors 450, 452, 454, 456, and waveguide 460 of system 400. Further, as shown, system 600 also includes reflectors 690 and 692.

Transmitter 640 may emit light 604 into waveguide 660 via optical element 634, similarly to, respectively, transmitter 440, light 404, waveguide 460, and optical element 434.

As shown in FIG. 6 however, waveguide 660 includes multiple output ends 660b, 660c, 660d, and 660e. Thus, for example, system 600 may present an alternative embodiment for providing multiple transmit/receive channels by using a single waveguide 660 instead of using multiple waveguides 460, 462, 464, 466.

For example, each of output ends 660b, 660c, 660d, 660e may be similar to side 460b of waveguide 460. Output end 660b may include a tilted mirror 650 (disposed thereon) that reflects a first portion of emitted light 604 out of the page (e.g., through a given side of waveguide 660, similar to side 360c). Similarly, a second portion of emitted light 604 could be reflected by mirror 652 and transmitted out of waveguide 660 at output end 660c; a third portion of emitted light 604 could be reflected by mirror 654 and transmitted out of waveguide 660 at output end 660d; and a fourth portion of emitted light 604 could be reflected by mirror 656 and transmitted out of waveguide 660 at output end 660e.

Additionally, although not shown, system 600 may also include a plurality of apertures that at least partially overlap (along the z-axis) locations of output ends 660b, 660c, 660d, 660e, similarly to the arrangement of apertures 420a, 420b, 420c, 420d shown in FIG. 4B relative to output ends of waveguides 460, 462, 464, 466. Further, system 600 may also include a plurality of receivers (not shown) that are co-aligned with the apertures (and thus with output ends 660b, 660c, 660d, 660e) similarly to receivers 410, 412, 414, 416 of FIG. 4C.

Thus, waveguide 660 can be used to distribute the energy from emitted light 604 into four different transmit paths that are co-aligned with receive paths that overlap output ends 660b, 660c, 660d, 660e (e.g., in the direction of the z-axis). To that end, for instance, light source 640 can be used to drive four separate transmit channels of system 600 using a single waveguide 660 instead of using four separate waveguides.

For example, waveguide 660 may extend lengthwise from input end 660a to output ends 660b, 660c, 660d, 660e. Further, as shown, waveguide 660 may include a first lengthwise portion 'a' that extends from input end 660a to a second lengthwise portion 'b' of waveguide 660; the second lengthwise portion 'b' may extend from the first lengthwise portion 'a' to a third lengthwise portion 'c' of waveguide 660; and the third lengthwise portion 'c' may extend from the second lengthwise portion 'b' to output ends 660b, 660c, 660d, 660e.

Additionally, system 600 may include reflectors 690, 692 that are arranged along opposite sides of the first lengthwise portion 'a'. Reflectors 690, 692 may be implemented as mirrors or other reflective materials that are configured to reflect wavelengths of emitted light 604 incident thereon. To that end, a non-exhaustive list of example reflective materials of reflectors 690, 692 includes gold, aluminum, other metal or metal oxide, synthetic polymers, hybrid pigments (e.g., fibrous clays and dyes, etc.), among other examples.

In one embodiment, reflectors 690, 692 may include two parallel mirrors that are disposed on or adjacent to horizontal sides (e.g., along two parallel x-z planes) of first waveguide portion 'a'. In this embodiment, reflectors 690 and 692 may together provide a homogenizer for emitted light 604 entering waveguide 660. For example, reflectors 690, 692 may reflect emitted light 604 incident thereon (horizontally). As a result, the energy of emitted light 604 entering the second portion 'b' of waveguide 660 may be distributed more uniformly (i.e., homogenized) relative to the energy distribution of emitted light 604 at input end 660. By doing so, for instance, the energy of emitted light 604 can be more uniformly distributed among the transmit channels associated with output ends 660b, 660c, 660d, 660e.

In some embodiments, system 600 may additionally or alternatively include reflectors disposed along other sides of waveguide 660 to homogenize emitted light 604 vertically (e.g., along z-axis) as well as horizontally (e.g., along y-axis). For example, two parallel reflectors can be similarly arranged along two other sides of waveguide 660 (e.g., sides that are parallel to the surface of the page) to homogenize emitted light 604 vertically.

In some implementations, emitted light 604 can be homogenized in a variety of ways in addition to or instead of using reflectors 690 and 692.

In a first implementation, system 600 may alternatively be configured without reflectors 690 and 692. For example, waveguide portion 'a' can be configured to have a sufficiently large length to allow homogenization of emitted light 604 via total internal reflection even without reflectors 690 and 692.

In a second implementation, one or more sides of waveguide 660 (e.g., the sides on which reflectors 690 and 692 are shown to be disposed and/or one or more other sides of waveguide portion 'a') can be alternatively or additionally tapered (e.g., tapered in or tapered out) to achieve better homogeneity of emitted light 608 in a shorter distance from side 660a to the second waveguide portion 'b' (e.g., shorter length of waveguide portion 'a' than in an implementation where the sides are not tapered).

In a third implementation, system 600 may include one or more mirrors that fold the path of emitted light 604 to achieve improved homogeneity of emitted light 604 in a shorter distance from side 660a to the second waveguide portion 'b' (e.g., shorter length of waveguide portion 'a' than in an implementation where the one or more mirrors are not present). Other implementations for homogenizing emitted light 604 are possible as well.

In some examples, as shown, a width of waveguide 660 in the second lengthwise portion 'b' may gradually increase to control divergence (horizontally) of emitted light 604 that is guided inside the second portion 'b' toward the third portion 'c'. In this way, waveguide 660 can allow divergence of emitted light 604 (horizontally) before guiding respective portions of the guided light toward output ends 660b, 660c, 660d, 660e. To that end, a length of the second portion 'b' may be selected to sufficiently allow emitted light 604 from first waveguide portion 'a' to diverge horizontally (e.g., in the direction of the y-axis) before being divided between the separate branches of waveguide 660 in waveguide portion 'c'.

In the third lengthwise portion 'c', waveguide 660 may include a plurality of elongate members (e.g., branches, etc.) that extend away from one another to define separate transmit paths of respective portions of emitted light 604 toward output ends 660b, 660c, 660d, 660e. In the example shown, waveguide 660 has four elongate members (e.g., branches, etc.). A first elongate member may correspond to the portion of waveguide 660 that extends from waveguide portion 'b' to output end 660b; a second elongate member may correspond to the portion of waveguide 660 that extends from waveguide portion 'b' to output end 660c; a third elongate member may correspond to the portion of waveguide 660 that extends from waveguide portion 'b' to output end 660d; and a fourth elongate member may correspond to the portion of waveguide 660 that extends from waveguide portion 'b' to output end 660e.

With this arrangement, waveguide 660 may guide: a first portion of emitted light 604 via the first elongate member toward end 660b; a second portion of emitted light 604 via the second elongate member toward end 660c; a third portion of emitted light 604 via the third elongate member toward end 660d; and a fourth portion of emitted light 604 via the fourth elongate member toward end 660e. Further, for example, the respective portions of emitted light 604 (guided via the respective elongate members) may then be reflected by mirrors 650, 652, 654, 656 out of the page (e.g., in the direction of the z-axis) and toward a scene.

Thus, with this arrangement, waveguide 660 may be configured as a beam splitter that splits portions of emitted light 604 into several portions that are guided through a respective elongate member (e.g., branch) of waveguide 660 toward a respective output end. Alternatively or additionally, in some implementations, an elongate member can extend toward one or more additional elongate members (not shown) instead of terminating at an output end. For example, the first elongate member (associated with output end 660b) may split the guided light therein into a plurality of branches (e.g., elongate members) that terminate with several output ends instead of the single output end 660b. Thus, in this example, waveguide 660 can separate light 604 (guided therein) into additional output ends to define additional transmit (and/or receive) channels of system 600. Further, in some examples, each of the additional branches extending from the first elongate member can be similarly split to more branches, etc. Similarly, the second, third, and/or fourth elongate members (respectively associated with output ends 660c, 660d, 660e) can alternatively or additionally extend toward multiple branches of waveguide 660 instead of terminating, respectively, at output ends 660c, 660d, 660e.

Thus, it is noted that waveguide 660 is shown to have one input end and four output ends only for the sake of example. Various alternative implementations of waveguide 660 are possible without departing from the scope of the present disclosure. In one example, fewer or more elongate members may extend from waveguide portion 'b'. In another example, one or more of the elongate members in waveguide portion 'c' can be split into multiple separate branches instead of terminating at a respective output end. Other examples are possible.

With any of these arrangements for example, waveguide 660 can thus be configured to drive multiple transmit channels using a same light source (e.g., light source 640). Further, in some examples, each of the transmit channels defined by waveguide 660 may transmit a respective light pulse at a substantially similar time (e.g., in a grid pattern, etc.) toward an environment of system 600 (e.g., the respective light pulses may originate from a single light pulse that was split by waveguide 660).

In some implementations, a cross-sectional area of at least part of an elongate member of waveguide 660 may gradually decrease in a direction of propagation of the guided light therein. For example, as shown, the first elongate member may have a gradually decreasing cross-sectional area near output end 660b. With this configuration, for instance, the angular spread of rays in the first portion of emitted light 604 exiting waveguide 660 at output end 660b may be larger than if there was no taper (i.e., gradually decreasing cross-sectional area) near output end 660b. Alternatively, in another embodiment, the taper near output end 660b can be in an opposite direction (e.g., gradually increasing cross-sectional area of the first elongate member near output 660b). In this embodiment, the angular spread of rays in the first portion of emitted light 604 exiting waveguide 660 at output 660b may be smaller than if there was no taper near output end 660b. Thus, in some implementations, system 600 can be configured to control the angular spread of rays in transmitted light signals by tapering side walls of waveguide 660. Through this process, for instance, the angular spread of the transmitted rays may be selected to match a numerical aperture of a lens (not shown), such as any of lenses 130, 230, 330, 430, 530, and/or 630 for instance, that directs the transmitted rays toward an environment of system 600.

As shown, the second, third, and fourth elongate members may also have gradually decreasing widths (e.g., walls of waveguide 660 tapered in) near respective output ends 660c, 660d, 660e. However, in line with the discussion above, the walls of waveguide 660 near output ends 660c, 660d, 660e, could alternatively be tapered out (e.g., gradually increasing cross-sectional areas, etc.) to otherwise control the angular spread of output light beams depending on the particular configuration (e.g., lens characteristics, etc.) of system 600.

It is noted that system 600 may include fewer, more, and/or different components than those shown. For example, although waveguide 660 is shown to include four elongate members that define four transmit paths extending through four output ends 660b, 660c, 660d, 660e, waveguide 660 may alternatively include fewer or more output ends (and associated elongate members). In one embodiment, waveguide 660 may direct emitted light 604 toward eight output ends. In this embodiment, a single light source 640 may drive eight separate transmit channels (co-aligned with 8 corresponding receive channels) of system 600. Further, in this embodiment, system 600 may include 32 waveguides coupled to 32 light sources. Thus, in this embodiment, system 600 may define 32*8=256 co-aligned transmit/receive channels that are driven using 32 light sources (e.g., lasers, etc.). Other configurations are possible.

III. EXAMPLE METHODS AND COMPUTER READABLE MEDIA

Figure 7:
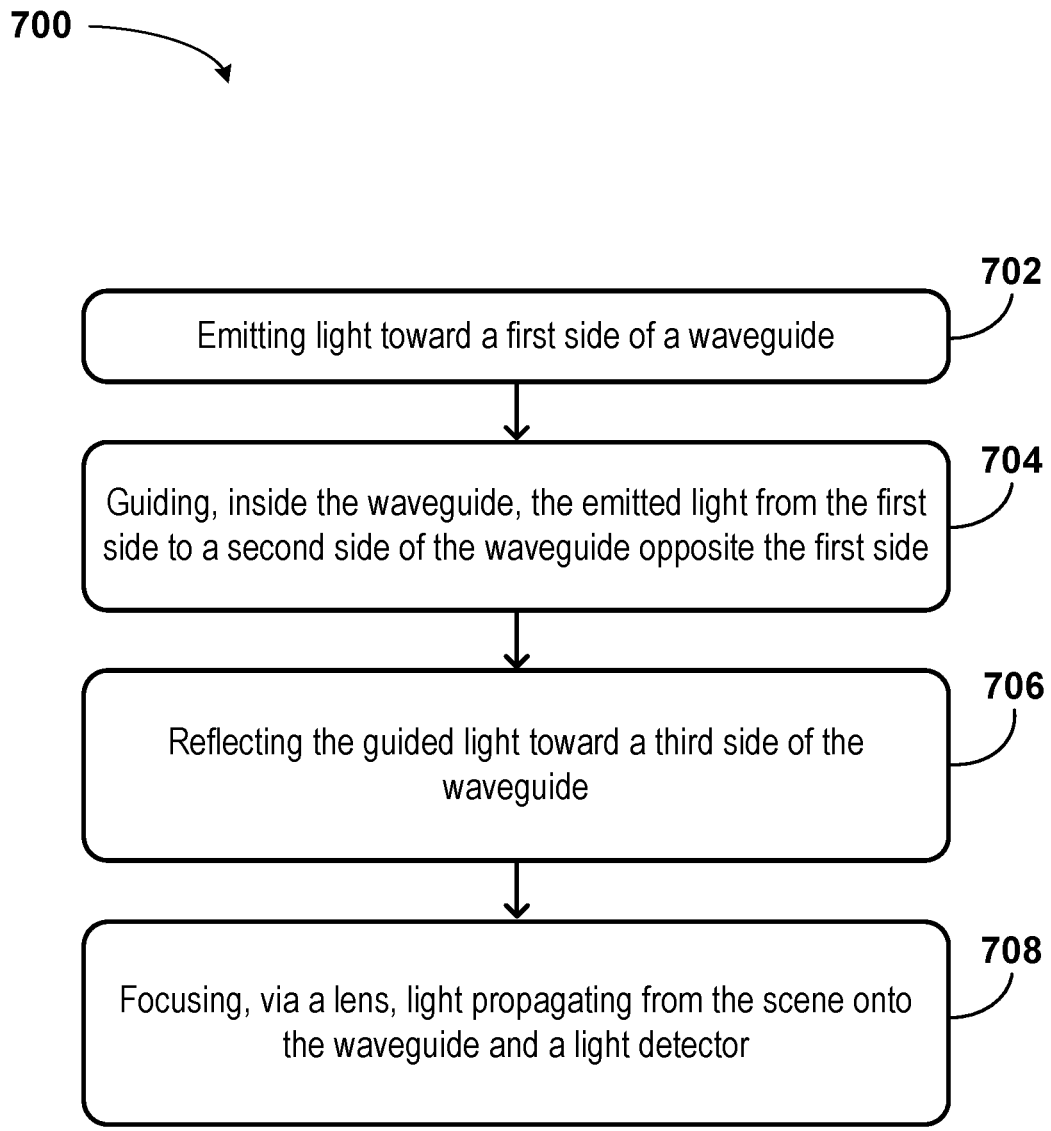
FIG. 7 is a flowchart of a method, according to example embodiments.

FIG. 7 is a flowchart of a method 700, according to example embodiments. Method 700 presents an embodiment of a method that could be used with systems 100, 290, 300, 400, 500, 600, and/or device 200, for example. Method 700 may include one or more operations, functions, or actions as illustrated by one or more of blocks 702-708. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 700 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 700 and other processes and methods disclosed herein, each block in FIG. 7 may represent circuitry that is wired to perform the specific logical functions in the process.

At block 702, method 700 involves emitting (e.g., via light source 340) light (e.g., 304) toward a first side (e.g., 360a) of a waveguide (e.g., 360). At block 704, method 700 involves guiding, inside the waveguide, the emitted light from the first side to a second side (e.g., 360b) of the waveguide opposite the first side. At block 706, method 700 involves reflecting (e.g., via mirror 350) the guided light toward a third side (e.g., 360c) of the waveguide. In some examples, at least a portion of the reflected light may propagate out of the third side toward a scene. Referring back to FIGS. 3A and 3B for example, reflected light 304 may propagate through aperture 320a and lens 330 toward the scene (e.g., object 398). At block 708, method 700 involves focusing, via a lens (e.g., 330), light (e.g., 302) propagating from the scene onto the waveguide and a light detector (e.g., any of the light detectors included in array 310, etc.).

IV. CONCLUSION

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed:

1. A system comprising:
a light source that emits light;
a waveguide that guides the emitted light from a first side of the waveguide toward a second side of the waveguide opposite the first side, wherein the waveguide has a third side extending between the first side and the second side;
a mirror that reflects the guided light toward the third side of the waveguide, wherein at least a portion of the reflected light propagates out of the waveguide toward a scene;
a light detector; and
a lens that focuses light from the scene toward the waveguide and the light detector, wherein at least a portion of the focused light propagates from the lens to the light detector without propagating through the waveguide.

2. The system of claim 1, wherein the lens focuses a first portion of the focused light onto the waveguide and a second portion of the focused light adjacent to the waveguide, wherein the waveguide is at a first distance to the lens, and wherein the light detector is at a second distance to the lens.

3. The system of claim 1, further comprising an opaque material that defines an aperture, wherein at least a portion of the focused light is transmitted through the aperture toward the light detector.

4. The system of claim 3, wherein the opaque material is interposed between the lens and the waveguide, and wherein the at least portion of the reflected light propagates through the aperture toward the scene.

5. The system of claim 3, wherein the opaque material is interposed between the waveguide and the light detector.

6. The system of claim 1, wherein the mirror is at a first angle to the third side of the waveguide, wherein the first side of the waveguide is at a second angle to the third side of the waveguide, and wherein the first angle is less than the second angle.

7. The system of claim 1, wherein the second side of the waveguide is tilted toward the third side, and wherein the mirror is disposed on the second side.

8. The system of claim 1, further comprising:
a first substrate, wherein the third side of the waveguide is disposed on the first substrate;
a second substrate; and
a given material disposed between the first substrate and the second substrate, wherein the given material is in contact with the first substrate, the second substrate, and the waveguide, and
wherein the waveguide has an index of refraction greater than a given index of refraction of the given material.

9. The system of claim 8, wherein the waveguide comprises a photoresist, and wherein the given material comprises an adhesive that couples the first substrate to the second substrate.

10. The system of claim 1, further comprising:
a light filter disposed between the waveguide and the light detector, wherein the light filter attenuates light propagating toward the light detector.

11. A system comprising:
a light source that emits light;
a waveguide having an input end and one or more output ends opposite the input end, wherein the waveguide guides the emitted light from the input end to the one or more output ends, and wherein the waveguide has a given side that extends from the input end to the one or more output ends;
one or more mirrors that reflect at least a portion of the guided light toward the given side of the waveguide, wherein the reflected light propagates out of the waveguide;
a lens that directs, toward a scene, the reflected light propagating out of the waveguide;
an opaque material that defines a plurality of apertures including at least a first aperture and a second aperture;

a first array of light detectors; and a second array of light detectors, wherein the lens focuses light from the scene toward the waveguide and the first and second arrays of light detectors, wherein the lens focuses a first portion of the focused light into the first aperture and the first portion of the focused light propagates toward the first array of light detectors via the first aperture, and wherein the lens focuses a second portion of the focused light into the second aperture and the second portion of the focused light propagates toward the second array of light detectors via the second aperture.

12. The system of claim 11, wherein the one or more output ends include at least a first end and a second end, wherein the waveguide comprises a plurality of elongate members including at least a first elongate member and a second elongate member, wherein the first elongate member guides a first portion of the emitted light toward the first end, and wherein the second elongate member guides a second portion of the emitted light toward the second end.

13. The system of claim 12, wherein the one or more mirrors include at least a first mirror and a second mirror, and wherein the waveguide guides the first portion of the emitted light toward the first mirror via the first elongate member and the second portion of the emitted light toward the second mirror via the second elongate member.

14. The system of claim 12, wherein a cross-sectional area of at least a portion of the first elongate member gradually decreases in a direction of propagation of the first portion of the emitted light guided inside the first elongate member.

15. The system of claim 11, wherein the one or more mirrors reflect a first portion of the emitted light toward the first aperture and a second portion of the emitted light toward the second aperture.

16. The system of claim 11, further comprising:

one or more reflectors, wherein the waveguide extends lengthwise from the input end to the one or more output ends, and wherein the one or more reflectors are disposed on a lengthwise portion of the waveguide.

17. The system of claim 16, wherein the lengthwise portion of the waveguide is adjacent to the input end, and wherein the one or more reflectors are disposed along at least two opposite sides of the lengthwise portion of the waveguide.

* * * * *